(12) United States Patent
Yaskevich

(10) Patent No.: US 11,753,037 B2
(45) Date of Patent: Sep. 12, 2023

(54) METHOD AND PROCESSOR FOR CONTROLLING IN-LANE MOVEMENT OF AUTONOMOUS VEHICLE

(71) Applicant: YANDEX SELF DRIVING GROUP LLC, Moscow (RU)

(72) Inventor: Siarhei Konstantinovich Yaskevich, Minsk (BY)

(73) Assignee: YANDEX SELF DRIVING GROUP LLC, Moscow (RU)

( * ) Notice: Subject to any disclaimer, the term of this patent is extended or adjusted under 35 U.S.C. 154(b) by 64 days.

(21) Appl. No.: 16/911,523

(22) Filed: Jun. 25, 2020

(65) Prior Publication Data

US 2021/0129866 A1 May 6, 2021

(30) Foreign Application Priority Data

Nov. 6, 2019 (RU) .............................. RU2019135571

(51) Int. Cl.
*B60W 60/00* (2020.01)
*B60W 30/095* (2012.01)
(Continued)

(52) U.S. Cl.
CPC .... *B60W 60/0025* (2020.02); *B60W 30/0956* (2013.01); *B60W 30/18163* (2013.01);
(Continued)

(58) Field of Classification Search
CPC ......... B60W 60/0025; B60W 30/0956; B60W 30/18163; B60W 2420/42;
(Continued)

(56) References Cited

U.S. PATENT DOCUMENTS 7,117,076 B2 10/2006 Shimakage et al.
8,918,273 B2 12/2014 Knoop et al.
(Continued)

FOREIGN PATENT DOCUMENTS

CN 106291736 A 1/2017
CN 108674185 A 10/2018
(Continued)

OTHER PUBLICATIONS

English Abstract for DE102014200279 retrieved on Espacenet on Jun. 23, 2020.
(Continued)

*Primary Examiner* — Angelina Shudy
*Assistant Examiner* — Mohamed Abdo Algehaim
(74) *Attorney, Agent, or Firm* — BCF LLP

(57) ABSTRACT

A method and a processor for controlling in-lane movement of a Self-Driving Vehicle (SDV) are provided. The method comprises: acquiring initial kinematic data associated with an obstacle; determining future kinematic data associated with the obstacle; acquiring initial kinematic data associated with the SDV; determining future kinematic data associated with the SDV which is indicative of at least two candidate future states of the SDV at a future moment in time; determining at least two candidate state-transition datasets for the SDV to transition from the initial state of the SDV to a respective one of the at least two candidate future states of the SDV using only in-lane movement; determining, by the electronic device, an energy efficiency score for a respective one of the at least two candidate state-transition datasets; determining a target state-transition dataset for the SDV based on respective energy efficiency scores.

16 Claims, 7 Drawing Sheets

(51) Int. Cl.
*B60W 30/18* (2012.01)
*G01C 21/34* (2006.01)

(52) U.S. Cl.
CPC ..... *G01C 21/3469* (2013.01); *B60W 2420/42* (2013.01); *B60W 2420/52* (2013.01)

(58) Field of Classification Search
CPC ........... B60W 2420/52; B60W 30/095; B60W 2554/4041; B60W 2554/4042; B60W 60/0027; B60W 60/0011; B60W 60/0023; B60W 60/0013; B60W 50/0097; B60W 30/12; G01C 21/3469
USPC .......................................................... 701/26
See application file for complete search history.

(56) References Cited

U.S. PATENT DOCUMENTS

| | | | |
|---|---|---|---|
| 9,058,247 B2 | 6/2015 | Fukamachi | |
| 9,645,577 B1* | 5/2017 | Frazzoli | B60W 30/0956 |
| 9,785,828 B2 | 10/2017 | Ayvaci et al. | |
| 9,823,661 B2 | 11/2017 | Pink et al. | |
| 9,868,443 B2* | 1/2018 | Zeng | B60W 30/16 |
| 10,195,992 B2 | 2/2019 | Gerardo et al. | |
| 2015/0360721 A1* | 12/2015 | Matsuno | B60W 30/18163 701/1 |
| 2016/0313133 A1* | 10/2016 | Zeng | B60W 60/00272 |
| 2017/0357267 A1 | 12/2017 | Foster et al. | |
| 2018/0089505 A1 | 3/2018 | El-Khamy et al. | |
| 2018/0209801 A1* | 7/2018 | Stentz | G01C 21/3415 |
| 2018/0345958 A1 | 12/2018 | Lo et al. | |
| 2018/0348012 A1* | 12/2018 | An | G07C 5/08 |
| 2018/0349746 A1 | 12/2018 | Vallespi-Gonzalez | |
| 2018/0364717 A1 | 12/2018 | Douillard et al. | |
| 2019/0025841 A1* | 1/2019 | Haynes | G05D 1/0214 |
| 2019/0049239 A1 | 2/2019 | Natroshvili et al. | |
| 2019/0061765 A1* | 2/2019 | Marden | B60W 30/18163 |
| 2019/0071092 A1* | 3/2019 | Ma | B62D 15/0255 |
| 2019/0084619 A1 | 3/2019 | Mizoguchi | |
| 2019/0087666 A1 | 3/2019 | Zhang et al. | |
| 2019/0122037 A1 | 4/2019 | Russell et al. | |
| 2019/0204842 A1* | 7/2019 | Jafari Tafti | G06N 3/04 |
| 2019/0257661 A1 | 8/2019 | Stentz et al. | |
| 2019/0315345 A1* | 10/2019 | Newman | B60W 50/14 |
| 2019/0317512 A1* | 10/2019 | Zhang | G05D 1/0238 |
| 2019/0329777 A1 | 10/2019 | Rajab et al. | |
| 2019/0353493 A1* | 11/2019 | Takahashi | G06K 9/00791 |
| 2020/0148204 A1* | 5/2020 | Kunz | B60W 30/162 |
| 2020/0377090 A1* | 12/2020 | Seccamonte | G06N 5/003 |
| 2021/0023990 A1* | 1/2021 | Lynar | B60W 50/16 |
| 2021/0048818 A1* | 2/2021 | Funke | B60W 60/0011 |
| 2021/0108936 A1* | 4/2021 | Seegmiller | B60W 30/18163 |
| 2021/0114617 A1* | 4/2021 | Phillips | B60W 30/0956 |
| 2021/0261159 A1* | 8/2021 | Pazhayampallil | G01S 17/89 |
| 2021/0312798 A1* | 10/2021 | Huang | G08G 1/0133 |
| 2021/0397194 A1* | 12/2021 | Aubert | G05D 1/0268 |
| 2022/0176995 A1* | 6/2022 | Subramanian | B60W 60/001 |
| 2022/0215756 A1* | 7/2022 | Becker | G06V 20/58 |

FOREIGN PATENT DOCUMENTS

| | | | |
|---|---|---|---|
| DE | 102014200279 A1 | 7/2015 | |
| DE | 102016218121 A1 | 3/2018 | |
| KR | 101041930 B1 | 6/2011 | |
| KR | 20140004409 A | 1/2014 | |
| RU | 2618837 C2 | 5/2007 | |
| WO | 2016/067640 A1 | 5/2016 | |
| WO | 2016/156236 A1 | 10/2016 | |
| WO | 2018/055377 A1 | 3/2018 | |
| WO | 2018/091386 A1 | 5/2018 | |
| WO | 2019/072674 A1 | 4/2019 | |

OTHER PUBLICATIONS

English Abstract for KR101041930 retrieved on Espacenet on Jun. 23, 2020.
English Abstract for KR20140004409 retrieved on Espacenet on Jun. 23, 2020.
English Abstract for CN 106291736 retrieved on Espacenet on Jun. 23, 2020.
English Abstract for CN 108674185 retrieved on Espacenet on Jun. 23, 2020.
European Search Report issued in European patent application 20178122.6 dated Jan. 11, 2021.
English translation of the abstract of DE 102016218121.
Russian Search Report dated Jan. 26, 2021 issued in respect of the counterpart Russian Patent Application No. RU 2019135571.

* cited by examiner

METHOD AND PROCESSOR FOR CONTROLLING IN-LANE MOVEMENT OF AUTONOMOUS VEHICLE

CROSS-REFERENCE

The present application claims priority from Russian Patent Application No. 2019135571, entitled "Method and Processor for Controlling In-Lane Movement of Autonomous Vehicle," filed on Nov. 6, 2019, the entirety of which is incorporated herein by reference.

FIELD OF TECHNOLOGY

The present technology relates to self-driving vehicles (SDVs) and, specifically, to method and processor for controlling in-lane movement of the SDV.

BACKGROUND

Several computer based navigation systems that are configured for aiding navigation and/or control of vehicle have been proposed and implemented in the prior art. These systems range from more basic map-aided localization based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control system, which systems upon detection of the vehicle (or other obstacles) in front of the moving vehicle, slow down or stop the vehicle.

Some of the more advanced system provide for a fully autonomous driving of the vehicle without direct control from the operator (i.e. the driver), so-called Self-Driving Vehicles (SDVs). A given SDV includes computer systems that can cause the SDV to accelerate, break, stop, change lane and self-park.

One of the technical challenges in implementing the above computer systems is planning an SDV trajectory with respect to an obstacle (another vehicle, for example) the SDV may face while driving. When the SDV is about to make a manoeuver (changing a lane, for example), the obstacle in one of the neighbouring lanes may pose a risk/danger to the SDV, which may require the computer systems to take corrective measures, be it breaking or otherwise active accelerating resulting in building the SDV trajectory in such a way that the SDV will finish the manoeuver safely, both to the SDV and the other road users.

More specifically, the challenge of planning the SDV trajectory comprises determining kinematic data associated with the SDV at an initial moment in time (the moment of beginning the manoeuver) and at a target moment in time (the moment for finishing the manoeuver) in such a way that the SDV would finish the manoeuvre safely with respect to at least one obstacle it may face while making the manoeuvre. Based on these data, the computer systems may then be configured to determine a more optimal solution to the trajectory planning in terms of safety code rules abidance, fuel consumption, and overall comfort of passengers of the SDV, to name a few.

The acuteness of this problem is illustrated by the following hypothetical scenario. Imagine that the SDV (or a partially-autonomous vehicle) is driving down a given road section. At some point, according to a predetermined route, the SDV needs to change a lane in a predetermined time interval (for example, to exit a highway). However, there is another vehicle driving down the lane, whereto the SDV is being directed. Accordingly, the SDV trajectory should be planned in such a way that the SDV would avoid a collision with the other vehicle.

There are several trajectory-determination methods known in the art.

U.S. Pat. No. 8,918,273-B2 granted on Dec. 23, 2014, assigned to Robert Bosch GmbH and entitled "Method for determining an evasion trajectory for a motor vehicle, and safety device or safety system" teaches a method for determination of an optimized evasion trajectory by a safety device or a safety system, in particular a lane change assistance system and/or evasion assistance system, of a motor vehicle, the optimized evasion trajectory being outputted to a vehicle driver, and/or a trajectory of the motor vehicle being optionally partially adapted to the optimized evasion trajectory, by way of the method, the optimized evasion trajectory being determined by optimization of a transverse-dynamic quality factor (J), for which a transverse acceleration (a) and/or a transverse jerk (a') of the motor vehicle is/are utilized. Also described is a safety device or a safety system, in particular to a lane change assistance system and/or an evasion assistance system for a motor vehicle, a method being executable and/or being executed by the safety device or the safety system.

United States Patent Application Publication No. 2019/0,084,619-A1 published on Mar. 21, 2019, assigned to Subaru Corp. and entitled "Traveling control apparatus of vehicle" teaches a traveling control apparatus of vehicle includes a lane change controller, a position detector, and a lane detector. The lane change controller includes first and second course generators that respectively generate first and second courses as target courses of a vehicle in first and second lanes. The first and the second course generators respectively calculate first and second target movement amounts, in width directions of the first and the second lanes, of the vehicle when the vehicle is moved along the first and the second courses, and respectively generate the first and the second courses on a basis of the first and the second target movement amounts and first and second jerks. The first and the second jerks are each a rate of change of acceleration of the vehicle in the width direction of the first lane in the first course or the second lane in the second course.

U.S. Pat. No. 9,868,443-B2 granted on Jan. 16, 2018, assigned to GM Global Technology Operations LLC, and entitled "Reactive path planning for autonomous driving" teaches a method of adaptively re-generating a planned path for an autonomous driving manoeuvre. An object map is generated based on the sensed objects in a road of travel. A timer re-set and actuated. A planned path is generated for autonomously maneuvering the vehicle around the sensed objects. The vehicle is autonomously maneuvered along the planned path. The object map is updated based on sensed data from the vehicle-based devices. A safety check is performed for determining whether the planned path is feasible based on the updated object map. The planned path is re-generated in response to a determination that the existing path is infeasible, otherwise a determination is made as to whether the timer has expired. If the timer has not expired, then a safety check is re-performed; otherwise, a return is made to re-plan the path.

SUMMARY

It is an object of the present technology to ameliorate at least some of the inconveniences present in the prior art. Embodiments of the present technology may provide and/or broaden the scope of approaches to methods of achieving the aims and objects of the present technology.

Developers of the present technology have appreciated at least one technical problem associated with the prior art approaches.

For example, in order for the SDV to change the lane safely, the SDV has to consider kinematic data (such as velocity and acceleration) of the other vehicle to avoid collision therewith. In this respect, there are at least two options of planning the SDV trajectory: (1) changing the lane including passing the other vehicle, and (2) changing the lane without passing the other vehicles, i.e. letting the other vehicle pass first. One approach to selecting one option over the other could be based on efficiency of energy consumption by the SDV associated therewith.

The developers of the present technology have realized that overall in-lane jerks (a rate of change of acceleration of the SDV in a longitudinal direction with respect to the SDV trajectory) associated with each of the possible options of planning the trajectory of the SDV performing the manoeuvre may be representative of the efficiency of energy consumption by the SDV. For example, the developers have noted that an abrupt acceleration and/or deceleration require SDV to consume more energy compared to a mode of driving at a sufficiently constant acceleration/deceleration. Accordingly, the more abrupt acceleration/deceleration of the SDV during the manoeuver is, the more energy the SDV needs to finish the manoeuvre.

The developers of the present technology have also appreciated that in-lane jerks associated with each of the options for planning the trajectory of the SDV performing the manoeuvre may be indicative of smoothness of the SDV movement, which is a factor influencing the comfort of the passengers.

In contrast with some prior art approaches, the present technology is directed to calculating, for each of possible option for planning the SDV trajectory, a speed profile (a set of velocity and acceleration values within predetermined time intervals) minimizing the in-lane jerks associated therewith, and then, selecting the most jerk-efficient option for planning the SDV trajectory portion associated with an in-lane movement.

In accordance with a first broad aspect of the present technology, there is provided a method of controlling in-lane movement of a Self-Driving Vehicle (SDV). The SDV travels in-lane on a road section. The in-lane movement of the SDV is controlled for allowing the SDV to perform a future manoeuvre. The future manoeuvre is to be performed at a pre-determined future moment in time. The method is executable by an electronic device communicatively coupled to the SDV. The method comprises: acquiring, by the electronic device, initial kinematic data associated with an obstacle which is indicative of an initial state of the obstacle at an initial moment in time, the initial moment in time being earlier in time than the pre-determined future moment in time; determining, by the electronic device, future kinematic data associated with the obstacle which is indicative of a future state of the obstacle at the pre-determined future moment in time; acquiring, by the electronic device, initial kinematic data associated with the SDV which is indicative of an initial state of the SDV at the initial moment in time; determining, by the electronic device, future kinematic data associated with the SDV which is indicative of at least two candidate future states of the SDV at the pre-determined future moment in time, the at least two candidate future states of the SDV allowing the SDV to perform the future manoeuvre at the pre-determined future moment in time; determining, by the electronic device, at least two candidate state-transition datasets for the SDV to transition from the initial state of the SDV to a respective one of the at least two candidate future states of the SDV using in-lane movement; determining, by the electronic device, an energy efficiency score for a respective one of the at least two candidate state-transition datasets, a given energy efficiency score being indicative of how fuel-efficient the transition between the initial state and the respective candidate future state is; and triggering, by the electronic device, control of the in-lane movement of the SDV based on a target state-transition dataset amongst the at least two candidate state-transition datasets, the target state-transition dataset being a most fuel-efficient state-transition dataset amongst the at least two candidate state-transition datasets.

In some implementations of the method, the method further comprises comparing, by the server, the energy efficiency scores of the at least two candidate state-transition datasets for determining the target state-transition dataset.

In some implementations of the method, the method further comprises: determining, by the electronic device, a road-rule-abiding score for a respective one of the at least two candidate state-transition datasets. A given road-rule-abiding score is indicative of whether the transition between the initial state and the respective candidate future state abides by road rules of the road section. The target state-transition dataset is the most fuel-efficient state-transition dataset amongst the at least two candidate state-transition datasets that allows the SDV to abide by the road rules of the road section.

In some implementations of the method, the future manoeuvre is a lane-change from an initial lane in which the SDV is travelling at the initial moment time to another lane in which the obstacle is present at the initial moment in time.

In some implementations of the method, the obstacle is one of a moving obstacle and an immobile obstacle.

In some implementations of the method, the pre-determined future moment in time is a moment in time when the SDV is free of the obstacle.

In some implementations of the method, the moving obstacle is another vehicle.

In some implementations of the method, a given candidate state-transition dataset includes candidate kinematic data about the SDV at a plurality of intermediate moments in time between the initial moment in time and the future moment in time.

In some implementations of the method, the triggering control of the in-lane movement of the SDV based on a target state-transition dataset comprises: triggering, by the electronic device, control of at least one of in-lane acceleration and in-lane deceleration of the SDV, such that (i) actual kinematic data of the SDV at the plurality of intermediate moments in time matches (ii) target kinematic data from the target state-transition dataset at the plurality of intermediate moments in time.

In some implementations of the method, the determining the at least two candidate state-transition datasets is performed by an in-lane jerk minimization algorithm, and a given candidate state-transition dataset for the SDV defines a most jerk-efficient state-transition dataset for the SDV to transition from the initial state of the SDV to a respective candidate future state of the SDV using in-lane movement.

In some implementations of the method, in-lane movement is characterized by at least one of: an in-lane acceleration and an in-lane deceleration.

In some implementations of the method, the in-lane jerk minimization algorithm generates the at least two candidate state-transition datasets for the SDV, the at least two candidate state-transition datasets for the SDV being represented as speed profiles.

In some implementations of the method, the speed profiles are optimized to minimize the in-lane jerks.

In accordance with another broad aspect of the present technology, there is provided an electronic device. The electronic device comprises a processor; a communication interface for communicating with a sensor mounted on a Self-Driving Vehicle (SDV). The processor is configured to: acquire initial kinematic data associated with an obstacle which is indicative of an initial state of the obstacle at an initial moment in time, wherein the initial moment in time is earlier in time than the pre-determined future moment in time; determine future kinematic data associated with the obstacle which is indicative of a future state of the obstacle at the pre-determined future moment in time; acquire initial kinematic data associated with the SDV which is indicative of an initial state of the SDV at the initial moment in time; determine future kinematic data associated with the SDV which is indicative of at least two candidate future states of the SDV at the pre-determined future moment in time, the at least two candidate future states of the SDV allowing the SDV to perform the future manoeuvre at the pre-determined future moment in time; determine at least two candidate state-transition datasets for the SDV to transition from the initial state of the SDV to a respective one of the at least two candidate future states of the SDV using only in-lane movement; determine an energy efficiency score for a respective one of the at least two candidate state-transition datasets, a given energy efficiency score being indicative of how fuel-efficient the transition between the initial state and the respective candidate future state is; and trigger control of the in-lane movement of the SDV based on a target state-transition dataset amongst the at least two candidate state-transition datasets, the target state-transition dataset being a most fuel-efficient state-transition dataset amongst the at least two candidate state-transition datasets.

In some implementations of the electronic device, the processor is further configured to compare the energy efficiency scores of the at least two candidate state-transition datasets for determining the target state-transition dataset.

In some implementations of the electronic device, the processor is further configured to determine a road-rule-abiding score for a respective one of the at least two candidate state-transition datasets. A given road-rule-abiding score is indicative of whether the transition between the initial state and the respective candidate future state abides by road rules of the road section. The target state-transition dataset is the most fuel-efficient state-transition dataset amongst the at least two candidate state-transition datasets that allows the SDV to abide by the road rules of the road section.

In some implementations of the electronic device, the processor configured to trigger control of the in-lane movement of the SDV based on a target state-transition dataset is further configured to: trigger control of at least one of in-lane acceleration and in-lane deceleration of the SDV, such that (i) actual kinematic data of the SDV at the plurality of intermediate moments in time matches (ii) target kinematic data from the target state-transition dataset at the plurality of intermediate moments in time.

In some implementations of the electronic device, the processor configured to determine the at least two candidate state-transition datasets is further configured to perform an in-lane jerk minimization algorithm. A given candidate state-transition dataset for the SDV defines a most jerk-efficient state-transition dataset for the SDV to transition from the initial state of the SDV to a respective candidate future state of the SDV using only in-lane movement.

In some implementations of the electronic device, the processor, using the in-lane jerk minimization algorithm, is configured to generate the at least two candidate state-transition datasets for the SDV, the at least two candidate state-transition datasets for the SDV being represented as speed profiles.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
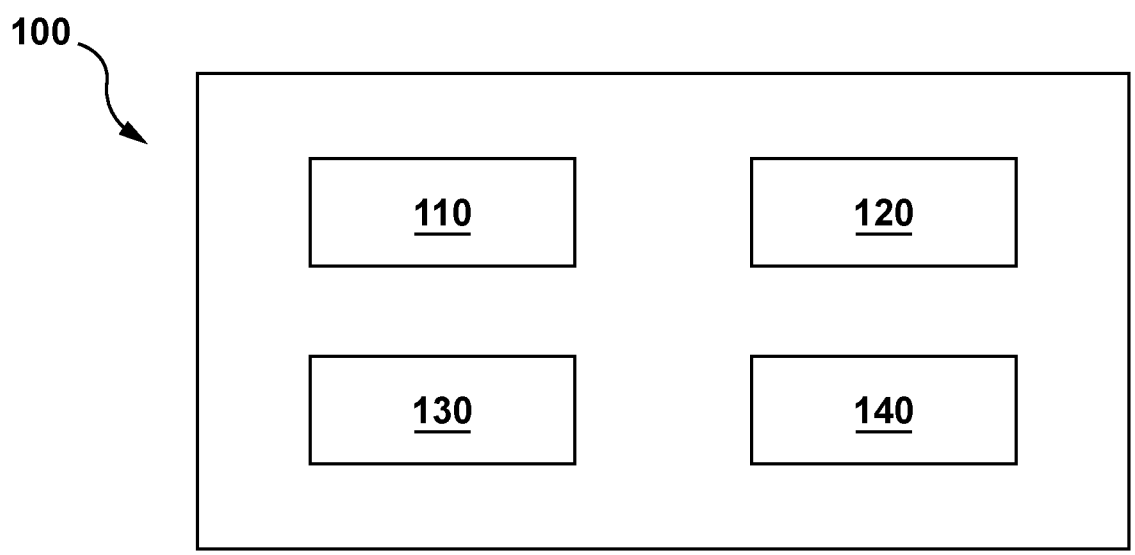
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components, such as a network communication module 140 for communication, via a communication network (for example, a communication network 240 depicted in FIG. 2) with other electronic devices and/or servers, localization modules (not depicted), and the like.

Networked Computer Environment

Figure 2:
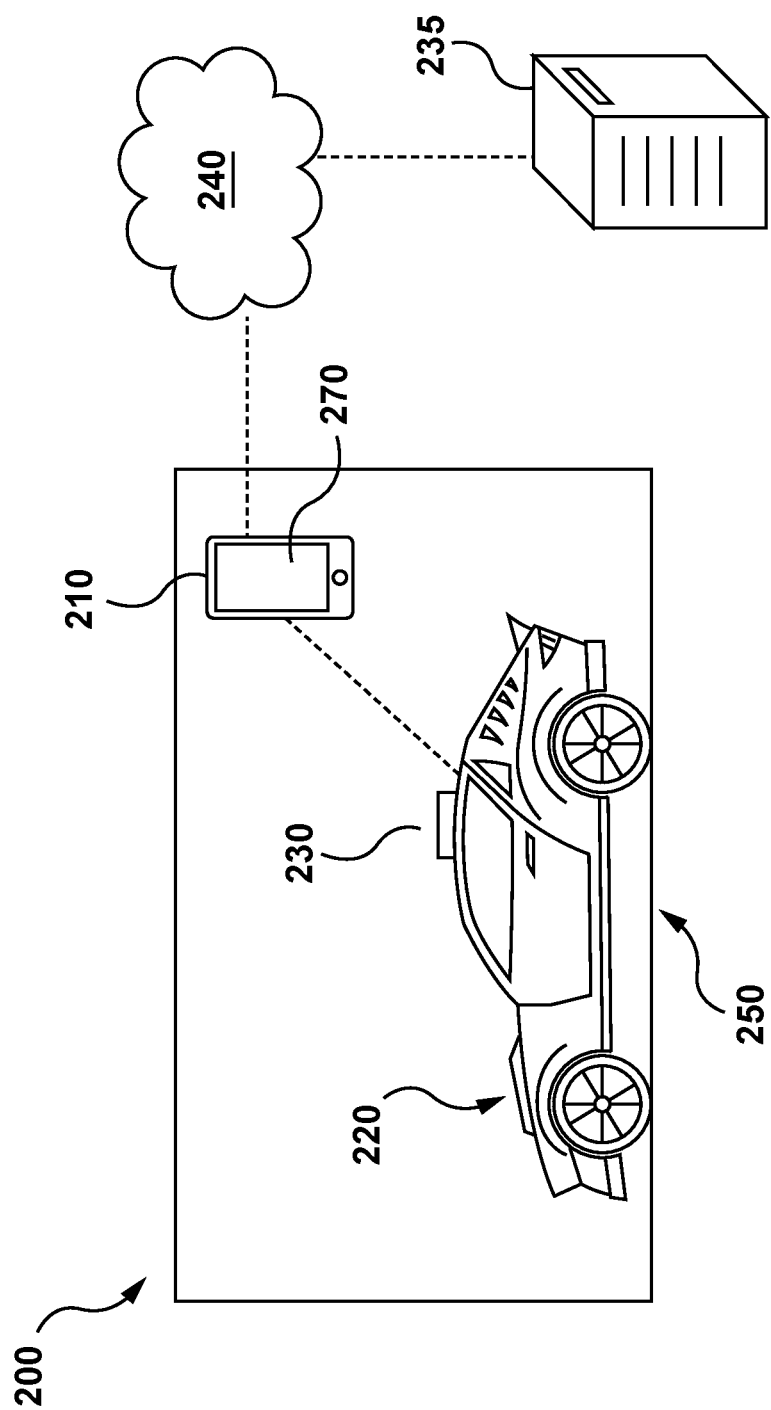
FIG. 2 depicts a networked computing environment suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, or associated with a user (not depicted) who can operate the vehicle 220, a server 235 in communication with the electronic device 210 via the communication network 240 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, with which the electronic device 210 is associated, may comprise any leisure or transportation vehicle such as a private or commercial car, truck, motorbike or the like. The vehicle may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, and a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for determining a trajectory of the vehicle 220 at a given road segment considering obstacles therein, as will be described in greater detail below.

Sensor System

In the non-limiting embodiments of the present technology, the electronic device 210 comprises or has access to a sensor system 230. According to these embodiments, the sensor system 230 may comprise a plurality of sensors allowing for various implementations of the present technology. Examples of the plurality of sensors include but are not limited to: cameras, LIDAR sensors, and RADAR sensors, etc. The sensor system 230 is operatively coupled to the processor 110 for transmitting the so-captured information to the processor 110 for processing thereof, as will be described in greater detail herein below.

The sensor system 230 can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, the sensor system 230 can be mounted in a dedicated enclosure (not depicted) mounted on the top of the vehicle 220.

Further, the spatial placement of the sensor system 230 can be designed taking into account the specific technical configuration thereof, configuration of the enclosure, weather conditions of the area where the vehicle 220 is to be used (such as frequent rain, snow, and other elements) or the like.

In the non-limiting embodiments of the present technology, the sensor system 230 may comprise a sensor configured to capture an image of a surrounding area 250. In this regard the sensor system 230 may be a camera or a plurality thereof (not separately depicted).

How the camera is implemented is not particularly limited. For example, in one specific non-limiting embodiments of the present technology, the camera can be implemented as a mono camera with resolution sufficient to detect objects at pre-determined distances of up to about 30 m (although cameras with other resolutions and ranges are within the scope of the present disclosure).

In some embodiments of the present technology, the camera (or one or more cameras that make up the implementation of the sensor system 230) is configured to capture a pre-determine portion of the surrounding area 250 around the vehicle 220. In some embodiments of the present technology, the camera is configured to capture an image (or a series of images) that represent approximately 90 degrees of the surrounding area 250 around the vehicle 220 that are along a movement path of the vehicle 220.

In other embodiments of the present technology, the camera is configured to capture an image (or a series of images) that represent approximately 180 degrees of the surrounding area 250 around the vehicle 220 that are along a movement path of the vehicle 220. In yet additional embodiments of the present technology, the camera is configured to capture an image (or a series of images) that represent approximately 360 degrees of the surrounding area 250 around the vehicle 220 that are along a movement path of the vehicle 220 (in other words, the entirety of the surrounding area around the vehicle 220).

In a specific non-limiting example, the camera can be of the type available from FLIR Integrated Imaging Solutions Inc., 12051 Riverside Way, Richmond, BC, V6W 1K7, Canada. It should be expressly understood that the camera can be implemented in any other suitable equipment.

In the non-limiting embodiments of the present technology, the sensor system 230 may further comprise a LIDAR instrument (not separately depicted). Lidar stands for LIght Detection and Ranging. It is expected that a person skilled in the art will understand the functionality of the LIDAR instrument, but briefly speaking, a transmitter (not depicted) of the LIDAR sends out a laser pulse and the light particles (photons) are scattered back to a receiver (not depicted) of the LIDAR instrument. The photons that come back to the receiver are collected with a telescope and counted as a function of time. Using the speed of light (~3×108 m/s), the processor 110 can then calculate how far the photons have travelled (in the round trip). Photons can be scattered back off of many different entities surrounding the vehicle 220, such as other particles (aerosols or molecules) in the atmosphere, other cars, stationary objects or potential obstructions in front of the vehicle 220.

In a specific non-limiting example, the LIDAR instrument comprised in the sensor system 230 can be implemented as the LIDAR based sensor that may be of the type available from Velodyne LiDAR, Inc. of 5521 Hellyer Avenue, San Jose, Calif. 95138, United States of America. It should be expressly understood that the LIDAR instrument can be implemented in any other suitable equipment.

In some embodiments of the present technology, the LIDAR instrument comprised in the sensor system 230 can be implemented as a plurality of LIDAR based sensors, such as three, for example, or any other suitable number.

In the non-limiting embodiments of the present technology, the sensor system 230 may further comprise a RAdio Detection And Ranging (RADAR) instrument (not separately depicted). Briefly speaking, the RADAR instrument is a detection instrument using radio waves to determine a range, angle and/or velocity of objects. The RADAR instrument includes a transmitter producing electromagnetic waves, an antenna used for transmitting and receiving electromagnetic waves, a receiver, and a processor to determine properties of the detected objects. In alternative embodiments of the present technology, there may be a separate antenna for receiving waves, and a separate antenna for transmitting waves. The processor used for determining properties of surrounding objects may be the processor 110.

In some embodiments of then present technology, the RADAR instrument used in the sensor system 230 may comprise long-range, medium-range and short-range RADAR sensors. As a non-limiting example, the long-range RADAR sensor may be used for adaptive cruise control, automatic emergency braking, and forward collision warning, while the medium and short-range RADAR sensors may be used for park assist, cross-traffic alert, junction assist, and blind side detection.

In a specific non-limiting example, the RADAR instrument comprised in the sensor system 230 may be of the type available from Robert Bosch GmbH of Robert-Bosch-Platz 1, 70839 Gerlingen, Germany. It should be expressly understood that the RADAR instrument can be implemented in any other suitable equipment.

In some non-limiting embodiments of the present technology, the sensor system 230 may be used, by the processor 110, for image calibration. For example, using an image captured by the camera and the LIDAR point cloud captured by the LIDAR instrument, the processor 110 is configured to identify a given region of the image to correspond to a given region of the LIDAR point cloud captured by the LIDAR instrument. In other embodiments of the present technology, the sensor system 230 are calibrated such that for the image captured by the camera, the LIDAR point cloud captured by the LIDAR instrument, and the RADAR data captured by the RADAR instrument, the processor 110 is configured to identify a given region of the image to correspond to a given region of the LIDAR point cloud and the RADAR data.

In the non-limiting embodiments of the present technology, the vehicle 220 further comprises or has access to other sensors (not separately depicted). The other sensors include one or more of: an inertial measurement unit (IMU), a Global Navigation Satellite System (GNSS) instrument, ground speed RADARs, ultrasonic SONAR sensors, odometry sensors including accelerometers and gyroscopes, mechanical tilt sensors, magnetic compass, and other sensors allowing operation of the vehicle 220.

As a non-limiting example, the IMU may be fixed to the vehicle 220 and comprise three gyroscopes and three accelerometers for providing data on the rotational motion and linear motion of the vehicle 220, which may be used to calculate motion and position of the vehicle 220.

Communication Network

In some embodiments of the present technology, the communication network 240 is the Internet. In alternative non-limiting embodiments, the communication network 240 can be implemented as any suitable local area network (LAN), wide area network (WAN), a private communication network or the like. It should be expressly understood that implementations of the communication network 240 are for illustration purposes only. How a communication link (not separately numbered) between the electronic device 210 and the communication network 240 is implemented will depend inter alia on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 240 may also use a wireless connection with a server 235.

Server

In some embodiments of the present technology, the server 235 is implemented as a conventional computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like. In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

In some embodiments of the present technology, the server 235 may have access (locally and/or remotely) to information associated with a road map. Broadly speaking, the road map is a map of roads that are located in a city, a state, and/or other geographic areas. For example, a section of the road map may include information such as, but not limited to: presence of roads in that section, number of lanes on these roads, presence of intersections, presence of traffic lights, presence of pedestrian crosswalks, toll collectable for use of the section of the road, and the like.

In other embodiments of the present technology, the server 235 may have access (locally and/or remotely) to information indicative of road rules associated with the road map. Broadly speaking, road rules represent traffic laws that are determined by a body having jurisdiction and that are applicable on at least some portions of the road map. For example, road rules associated with a given section of the road map are representative of traffic laws that are applicable on that given section of the road map such as, but not limited to: pre-determined direction of traffic flow of each lane in the section of the road map, presence of particular road signs governing traffic on that section of the road map including, stop signs, yield signs, road lane signage, speed limits (for example, maximum allowed speed associated with the section of the road, minimum allowed speed associated with the section of the road), indications of other types of traffic laws or rules, and the like.

It is contemplated that the server 235 may be configured to provide to the processor 110 (e.g., the processor 110 of the electronic device 210) access to the information indicative of (i) a section of the road map corresponding to surroundings of the vehicle 220 and (ii) the road rules associated with that section of the road map.

To that end, in some non-limiting embodiments of the present technology, the server 235 may receive a request submitted by the electronic device 210 for provision of access to the information indicative of the section of the road map (corresponding to the surroundings of the vehicle 220) and of the respectively associated road rules. For example, the request submitted by the electronic device 210 may include information indicative of vehicle position (for example, expressed in global geo coordinates) of the vehicle 220. As a result, the server 235 may provide the electronic device 210 with access to the information (or provide the information itself) indicative of the section of the road map that includes the vehicle position of the vehicle 220 and of the respectively associated road rules.

How the electronic device 210 uses the information indicative of the section of the road map corresponding to the surroundings of the vehicle 220 and the road rules associated with that section of the road map will be described in greater details herein further below.

It should be noted that the electronic device 210 may be configured to acquire access to the information (or acquire the information itself) indicative of the section of the road map corresponding to the surroundings of the vehicle 220 and of the respectively associated road rules in a different manner than via the server 235. For instance, the information indicative of the road map and the road rules may be pre-downloaded and pre-stored by the electronic device 210.

Processor

As previously alluded to, the processor 110 (such as the processor 110 of the electronic device 210, for example) is configured to inter alia process (i) information that is provided thereto by the sensor system 230, (ii) information that is indicative of the section of the road map corresponding to the surroundings of the vehicle 220, and (iii) information that is indicative of the road rules associated with that section of the road map, for the purpose of decision making (such as generating manoeuvres and other trajectories for the vehicle 220) and/or operation (such as causing the vehicle 220 to execute such manoeuvres and other trajectories) of the vehicle 220.

In accordance with the non-limiting embodiments of the present technology, based at least in part on the data above, the processor 110 may be configured to control in-lane movement of the vehicle 220 performing a manoeuvre with respect to at least one obstacle such that the vehicle 220 drives along a more energy efficient trajectory. Put another way, the processor 110 may be configured to plan a trajectory of the vehicle 220 that performs the manoeuvre considering fuel consumption of the vehicle 220.

How the processor 110 is configured to determine the more energy efficient trajectory will be described now with reference to FIGS. 3 to 8.

Figure 3:
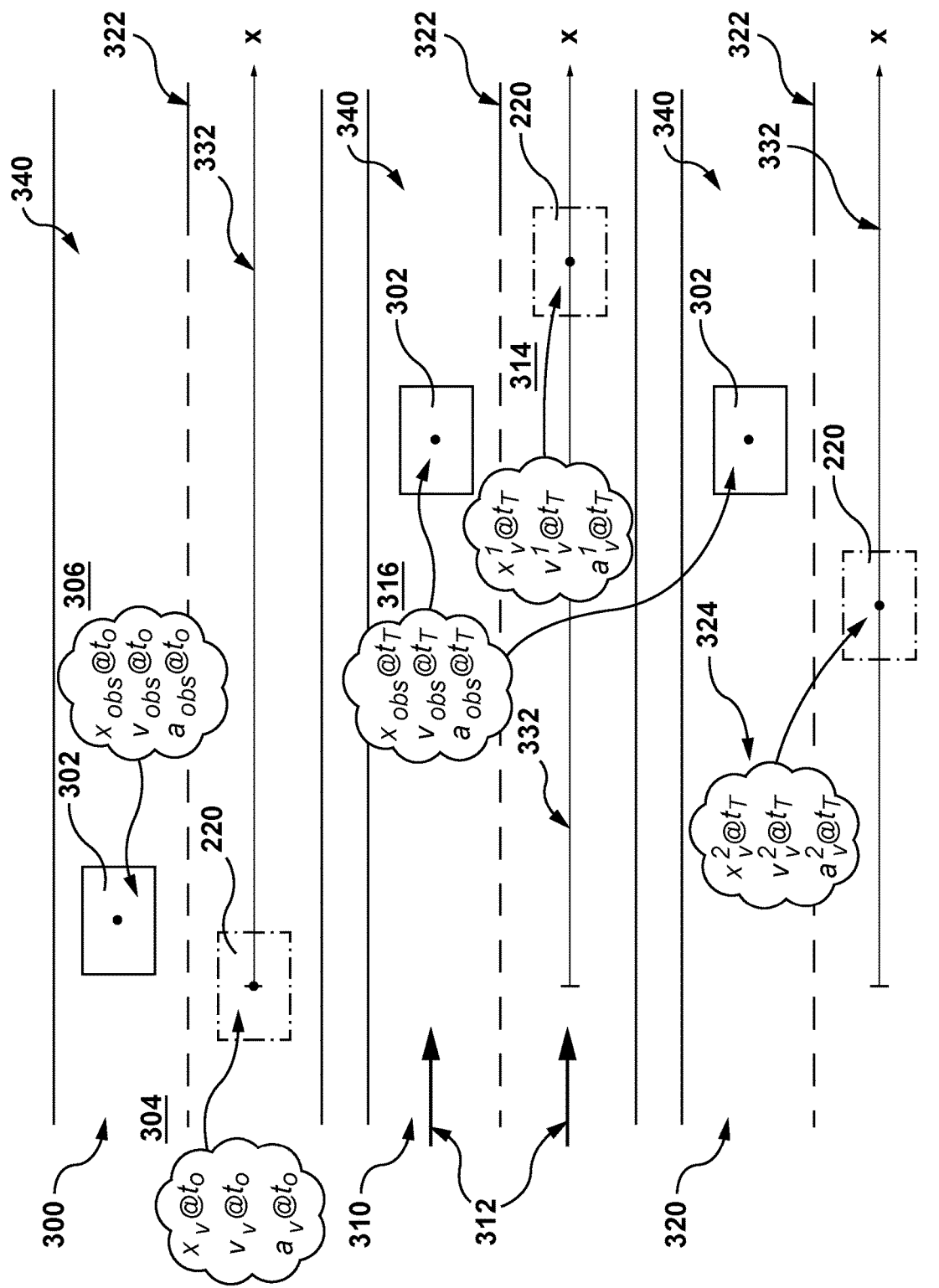
FIG. 3 depicts an example scenario for controlling an in-lane trajectory of the vehicle of FIG. 2 by a processor of the computer system of FIG. 1, according to the non-limiting embodiments of the present technology.

Referring initially to FIG. 3, there is depicted an example of a road scenario for controlling the in-lane movement of the vehicle 220, in accordance with the non-limiting embodiments of the present technology.

In the embodiments of FIG. 3, the vehicle 220 is travelling down a lane. The surroundings of the vehicle 220 are depicted by a road map section 340. At a predetermined future moment in time, the vehicle 220 may be caused by the processor 110 to perform a future manoeuvre. In the non-limiting embodiments of the present technology, the future manoeuvre may be a lane change, from the lane initially associated with the vehicle to one of neighbouring lanes. However, the one of neighbouring lanes the vehicle 220 is directed to may include at least one obstacle putting the vehicle 220 at risk of collisions.

In the embodiments of FIG. 3, the at least one obstacle is a moving obstacle, such as an obstacle 302, which includes another vehicle, a cyclist, and the like. In the non-limiting embodiments of the present technology, the at least one obstacle may also include an immobile obstacle, such as a road divider, a traffic light, a parked vehicle, and the like.

To that end, the processor 110 may be configured to cause the vehicle 220 to move, first, longitudinally, that is along the lane initially associated with the vehicle 220 (also, referred to herein as "in-lane movement"), and, second, transversely. In the embodiment of FIG. 3, a transverse movement of the vehicle 220 would be turning left. A moment in time when the processor 110 starts to cause the vehicle 220 an in-lane movement that is part of performing the lane change is referred to herein as an initial moment in time $t_0$. The vehicle 220 and the surrounding thereof at the initial moment in time $t_0$ is depicted by a visual representation 300 of the road map section 340. A moment in time when the processor 110 causes the vehicle 220 to switch from the in-lane movement to the transverse movement is referred to herein as a target moment in time $t_T$.

In the non-limiting embodiments of the present technology, the processor 110 may provide the vehicle 220 with at least two options of an in-lane trajectory (i.e. the trajectory the vehicle 220 is moving along before moving transversely, from the initial moment in time $t_0$ until the target moment in time $t_T$): (1) accelerating the vehicle 220 so the vehicle 220 is ahead of the obstacle 302 at a distance being no less than a first safety margin (not separately depicted)—which is depicted by a visual representation 310 of the road map section 340; or (2) decelerating the vehicle 220 so the vehicle 220 is before the obstacle 302 at a distance being no less than a second safety margin (not separately depicted)—which is depicted by a visual representation 320 of the road map section 340. The processor 110 may select the first safety margin and the second safety margin in such a way that the vehicle 220, from the target moment in time $t_T$ until finishing the lane change, would avoid any collision with the obstacle 302.

Put another way, the first and the second safety margins are selected by the processor 110 such that the vehicle 220, at the target moment in time $t_T$, is free of the obstacle 302 which allows for finishing the lane change safely. To that end, the visual representations 310 and 320 depict candidate states of the vehicle 220 that correspond to respective windows of opportunity for the vehicle 220 to perform the lane change at the target moment in time $t_T$. How the processor 110 is configured to select one candidate state of the vehicle 220 over the other will be described in greater detail below.

In the non-limiting embodiments of the present technology, the processor 110 may be configured to determine kinematic data associated with the vehicle 220 and the obstacle 302 at the initial moment in time $t_0$ and the target moment in time $t_T$. The processor 110 may be configured to select the initial moment in time $t_0$ and the target moment in time $t_T$ based on a predetermined time interval.

In the non-limiting embodiments of the present technology, the kinematic data comprises at least (1) a coordinate value along the axis 332, x; (2) an in-lane instantaneous velocity value, v; and (3) an in-lane instantaneous acceleration/deceleration value, a.

Thus, each of the visual representations 300, 310, and 320 generally illustrates the road map section 340 having (1) two lanes (extending from left to right in the orientation of FIG. 3), and (2) the obstacle 302. For illustration purposes only, it should be assumed that both the vehicle 220 and the obstacle 302 are travelling in the direction of the traffic indicated by arrows 312. Further, the vehicle 220 and the obstacle 302 are travelling in respective ones of the neighbouring lanes. It should further be noted that the visual representations 300, 310, and 320 are depicted solely for purposes of illustration of the scenario and, thus, the processor 110 does not actually display the visual representations 300, 310, and 320.

As it can be appreciated from FIG. 3, the visual representations 300, 310, and 320 also include representations of at least some road rules associated with the road map section 340. For example, the at least some road rules may prescribe traffic directions which travelling vehicles must abide by, and which is depicted by arrows 312. In another example, the at least some road rules may further prohibit the travelling vehicles a lane change, which is depicted by a visual representation 322. It should be noted however, that the visual representations 312 and 322 are depicted solely for purposes of illustration of the example scenario and, thus, the processor 110 does not have to actually display the visual representations 312 and 322.

Finally, each of the visual representations 300, 310, and 320 also depict the coordinate axis 332 extending from left to right (in the orientation of FIG. 3) and coinciding with the direction of the traffic in the road map section 340. The coordinate axis 332 serves solely as an aid in understanding the non-limiting embodiments of the present technology, and thus does not have to be displayed by the processor 110.

The lane change is hence characterized by the initial moment in time $t_0$ corresponding to an initial state of the vehicle 220 and the obstacle 302, and the target moment in time $t_T$. At the target moment in time $t_T$, the obstacle 302 is associated with an obstacle target state and the vehicle 220 is associated with at least two candidate target states (depicted at visual representations 310 and 320, respectively).

As such, the visual representation 300 depicts an initial state of the road map section 340 at the initial moment of time $t_0$, the time $t_0$ being a time when the vehicle 220 begins the lane change. The initial state of the road map section 340 includes: (1) an initial state of the vehicle 220 characterized by a vehicle initial kinematic data 304, ($x_v@t_0$; $v_v@t_0$; $a_v@t_0$), where $x_v@t_0$ is a coordinate value of the vehicle 220 at the initial moment in time $t_0$ along the axis 332;

$v_v@t_0$ is an instantaneous velocity value of the vehicle 220 at the initial moment in time $t_0$; and $a_v@t_0$ is an instantaneous acceleration value of the vehicle 220 at the initial moment in time $t_0$;

and (2) an initial state of the obstacle 302 characterized by an obstacle initial kinematic data 306, ($x_{obs}@t_0$; $v_{obs}@t_0$; $a_{obs}@t_0$), where $x_{obs}@t_0$ is a coordinate value of the obstacle 302 at the initial moment in time $t_0$ along the axis 332;

$v_{obs}@t_0$ is an instantaneous velocity value of the obstacle 302 at the initial moment in time $t_0$; and $a_{obs}@t_0$ is an instantaneous acceleration value of the obstacle 302 at the initial moment in time $t_0$.

In the non-limiting embodiments of the present technology, the processor 110 may be configured to determine a more energy efficient trajectory for the vehicle 220 that is about to perform the lane change as a most energy efficient in-lane transition between the initial state of the vehicle 220 and one of the at least two candidate target states of the vehicle 220.

To that end, first, the processor 110, at the time $t_0$, is configured to acquire an indication of the vehicle initial kinematic data 304 (using either the sensor system 230 and/or by virtue of the processor 110 having access to various components and systems of the vehicle 220) and an indication of the obstacle initial kinematic data 306 (using the sensor system 230).

As mentioned hereinabove, the visual representations 310 and 320 correspond to at least two possible candidate states of the road map section 340 at the target moment of time $t_T$, such as a first candidate state and a second candidate state, respectively. The visual representation 310 depicting the first candidate state of the road map section 340 includes: (1) a first candidate target state of the vehicle 220 characterized by first candidate kinematic data 314, ($x_v^1@t_T$; $v_v^1@t_T$; $a_v^1@t_T$), where $x_v^1@t_T$ is a coordinate value of the vehicle 220 at the target moment in time $t_T$ along the axis 332 corresponding to the first candidate target state of the vehicle 220;

$v_v^1@t_T$ is an instantaneous velocity value of the vehicle 220 at the target moment in time $t_T$ corresponding to the first candidate target state of the vehicle 220; and $a_v^1@t_T$ is an instantaneous acceleration value of the vehicle 220 at the target moment in time $t_T$ corresponding to the first candidate target state of the vehicle 220;

and (2) a target state of the obstacle 302 characterized by obstacle target kinematic data 316, ($x_{obs}@t_T$; $v_{obs}@t_T$; $a_{obs}@t_T$), where $x_v^1@t_T$ is a coordinate value of the obstacle 302 at the target moment in time $t_T$ along the axis 332 corresponding to the obstacle target state;

$v_v^1@t_T$ is an instantaneous velocity value of the obstacle 302 at the target moment in time $t_T$ corresponding to the to the obstacle target state; and $a_v^1@t_T$ is an instantaneous acceleration value of obstacle 302 at the target moment in time $t_T$ corresponding to the obstacle target state.

The visual representation 320 depicting the second candidate state of the road map section 340 includes: (1) a second candidate target state of the vehicle 220 characterized by second candidate kinematic data 324, ($x_v^2@t_T$; $v_v^2@t_T$; $a_v^2@t_T$), where $x_v^1@t_T$ is a coordinate value of the vehicle 220 at the target moment in time $t_T$ along the axis 332 corresponding to the second candidate target state of the vehicle 220;

$v_v^1@t_T$ is an instantaneous velocity value of the vehicle 220 at the target moment in time $t_T$ corresponding to the second candidate target state of the vehicle 220; and $a_v^1@t_T$ is an instantaneous acceleration value of the vehicle 220 at the target moment in time $t_T$ corresponding to the second candidate target state of the vehicle 220;

and (2) the target state of the obstacle 302 characterized by the obstacle target kinematic data 316, ($x_{obs}@t_T$; $v_{obs}@t_T$; $a_{obs}@t_T$).

According to the non-limiting embodiments of the present technology, in order to determine the most energy efficient in-lane transition for the vehicle 220, the processor 110 may further be configured to determine the obstacle target kinematic data 316, the first candidate kinematic data 314, and the second candidate kinematic data 324 based on initial kinematic data thereof.

Figure 4:
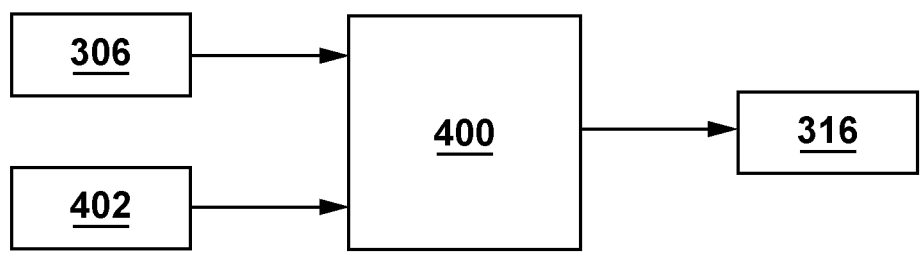
FIG. 4 depicts a process for determining, by the processor of the computer system of FIG. 1, kinematic data of an obstacle associated with a predetermined moment in time, according to the non-limiting embodiments of the present technology.

With reference to FIG. 4, there is schematically depicted a process for determining the obstacle target kinematic data 316, according to the non-limiting embodiments of the present technology.

In this regard, the processor 110 may have access to a kinematic data estimation model 400.

Broadly speaking, the kinematic data estimation model 400 represents a combination of kinematic mathematical models configured for generating kinematic data of the obstacle 302 for a pre-determined future moment in time based on initial kinematic data thereof. Non-limiting examples of the kinematic data estimation model 400 may include (i) a displacement graph of the obstacle 302 within the road map section 340; (ii) a system of kinematic time equations describing a kinematic movement of the obstacle 302 within the road map section 340; and (iii) a system of dynamic time equations describing dynamics (force factors influencing the obstacle 302, such as a side wind, for example) of the obstacle 302 within the road map section 340.

Accordingly, to generate the obstacle target kinematic data 316 of the obstacle 302, ($x_{obs}@t_T$; $v_{obs}@t_T$; $a_{obs}@t_T$), the processor 110 is configured to supply the obstacle initial kinematic data 306, ($x_{obs}@t_0$; $v_{obs}@t_0$; $a_{obs}@t_0$) and an indication of the target moment in time $t_T$ 402 as inputs to the kinematic data estimation model 400.

Figure 5:
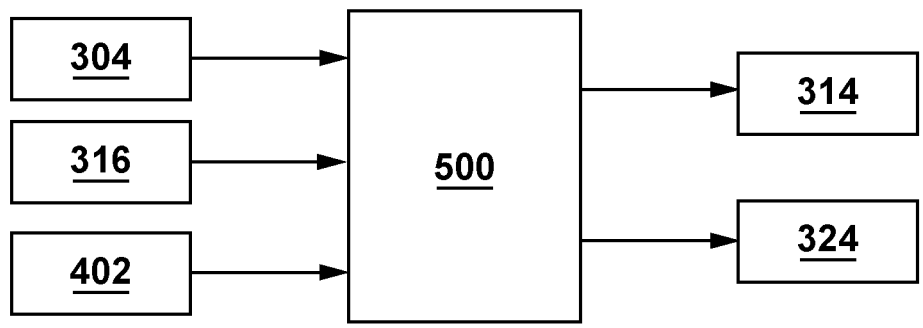
FIG. 5 depicts a process for determining, by the processor of the computer system of FIG. 1, at least two candidate kinematic data of the vehicle of FIG. 2 associated with a predetermined moment in time, according to the non-limiting embodiments of the present technology.

Referring now to FIG. 5, there is schematically depicted a process for generating the first candidate kinematic data 314 and the second candidate kinematic data 324, according to the non-limiting embodiments of the present technology.

In this regard, the processor 110 is configured to have access to a candidate final kinematic data estimation model 500. Akin to the kinematic data estimation model 400, the candidate final kinematic data estimation model 500 includes a combination of kinematic mathematical models configured for generating candidate kinematic data for the vehicle 220 for a predetermined moment in time based on initial kinematic data thereof and kinematic data of at least one obstacle at the predetermined moment in time.

Broadly speaking, the candidate final kinematic data estimation model 500 is configured to generate kinematic data for the vehicle 220 that will be caused by the processor 110 to perform the lane change at a predetermined future moment in time, for example, the target moment in time $t_T$. The candidate final kinematic data estimation model 500 may further be configured to take into account kinematic data of at least one obstacle at the target moment in time $t_T$. The at least one obstacle may be travelling in a lane neighbouring to the lane wherein the vehicle 220 is travelling, and which the vehicle 220 would take as a result of performing the lane change, such as the obstacle 302 depicted in FIG. 3. Thus, the kinematic data (such as a coordinate value along the axis 332, a velocity value, and an acceleration value, for example) generated by the candidate final kinematic data estimation model 500 allow the vehicle 220, at the target moment in time $t_T$, either (1) to take the first candidate state (depicted 310 in FIG. 3), that is ahead of the obstacle 302 at a distance no less than the first safety margin, or (2) to take the second candidate state (depicted 320 in FIG. 3), that is before the obstacle 302 at a distance no less than the second safety margin. The first and the second safety margins are predetermined by the processor 110 so that the vehicle 220 avoids a collision with the obstacle 302, thereby performing the lane change safely. In other words, the first safety margin and the second safety margin correspond to the respective windows of opportunity for the vehicle 220 to perform the lane change at the target moment in time $t_T$.

To that end, the processor 110 is configured to supply the following input data to the candidate final kinematic data estimation model 500: (1) the indication of the target moment in time $t_T$ 402 (2) the vehicle initial kinematic data 304, ($x_v@t_0$; $v_v@t_0$; $a_v@t_0$); and (3) the obstacle target kinematic data 316, ($x_{obs}@t_T$; $v_{obs}@t_T$; $a_{obs}@t_T$). Consequently, the candidate final kinematic data estimation model 500 outputs the first candidate kinematic data 314, ($x_v^1@t_T$; $v_v^1@t_T$; $a_v^1@t_T$) and the second candidate kinematic data 324, ($x_v^2@t_T$; $v_v^2@t_T$; $a_v^2@t_T$) corresponding to the first candidate state and the second candidate state of the vehicle 220 at the target moment in time $t_T$, respectively.

Although, in the embodiments described herein only one obstacle, i.e. the obstacle 302, is considered, a number of obstacles that the candidate final kinematic data estimation model 500 may take into account to generate the candidate kinematic data for the vehicle 220 is not limited. For example, in the embodiments of FIG. 3, there could be another moving obstacle (not depicted) following after the obstacle 302 at some distance. To that end, the processor 110 may be configured to supply to the candidate final kinematic data estimation model 500, additionally to the input data mentioned above: (4) a kinematic data associated with the other obstacle determined for the target moment in time $t_T$; (5) a distance between the obstacle 302 and the other obstacle. Given this, the candidate final kinematic data estimation model 500, for example, may generate candidate kinematic data for the vehicle 220 allowing the vehicle 220 at the target moment in time $t_T$ to either (i) take a first candidate state ahead of the obstacle 302 at a distance no less than the first safety margin; or (ii) take a second candidate state in between of the obstacle 302 and the other obstacle such that the vehicle 220 is at a distance no less than the second safety margin before the obstacle 302 and at a distance no less than the first safety margin ahead of the other obstacle; or finally, (iii) take a third candidate state before the other obstacle at a distance no less than the second safety margin. Accordingly, if the processor 110 determines that the distance between the obstacle 302 and the other obstacle does not allow for the second candidate state of the vehicle 220, the processor 110 discards the second candidate state.

In the non-limiting embodiments of the present technology, in order to determine a candidate target state of the vehicle 220 associated with the most energy efficient in-lane transition of the vehicle 220, the processor 110 may be further configured to determine, based on the first candidate kinematic data 314 and the second candidate kinematic data 324, respective candidate state-transition datasets, which will be now described with reference to FIG. 6.

Generally speaking, a given candidate state-transition dataset associated with the vehicle 220 represents a data structure including at least part of kinematic data associated with the vehicle 220 at a plurality of intermediate moments in time $t_i$ (100, for example) between the initial moment in time $t_0$ and the target moment in time $t_T$. How the plurality of the intermediate moments is selected is not limited and may include, for example, selecting the plurality of intermediate moments based on a predetermined step value. The processor 110 may determine the predetermined step value, for example, based on a vehicle initial velocity value of the vehicle 220. Alternatively, selecting the plurality of intermediate moments in time $t_i$ may be performed, by the processor 110, in any other manner.

According to the non-limiting embodiments of the present technology, the processor 110 may be configured to generate the given candidate state-transition dataset by using a jerk-minimization algorithm.

Figure 6:
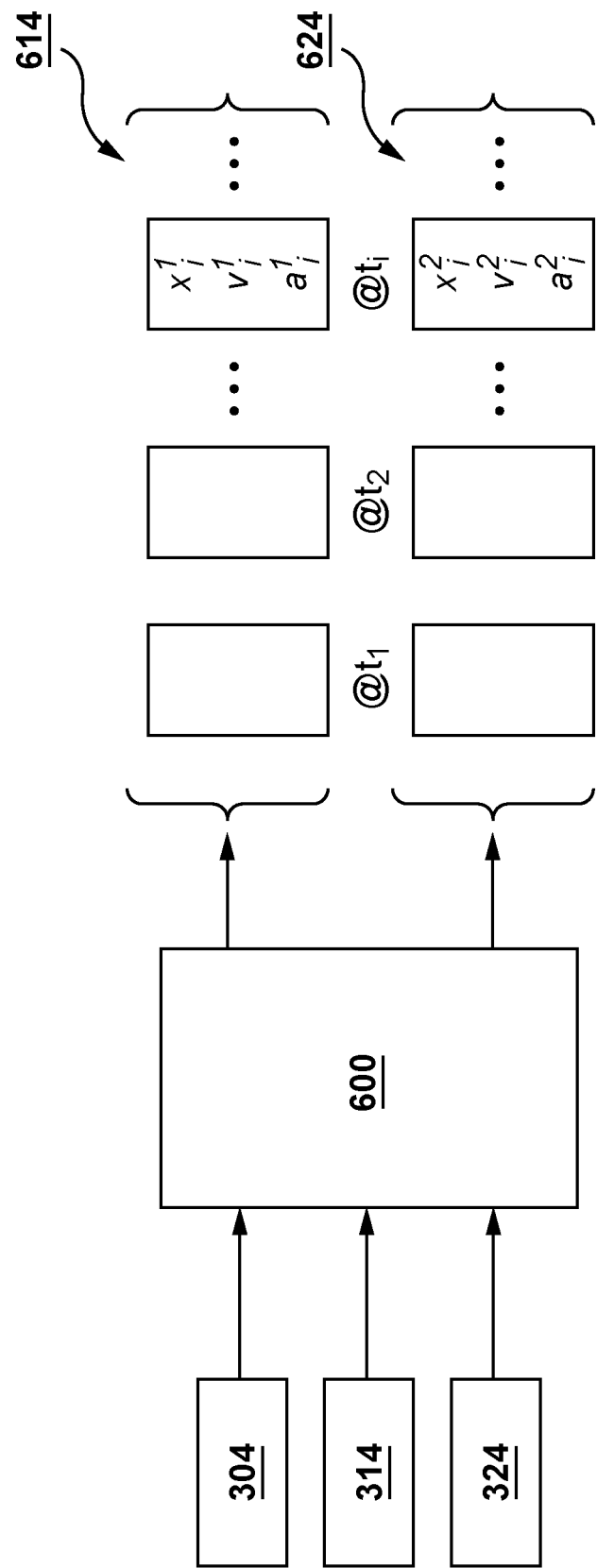
FIG. 6 depicts a process for determining candidate state-transition datasets for the vehicle of FIG. 2 by the processor of the computer system of FIG. 1, according to the non-limiting embodiments of the present technology.

With reference to FIG. 6, there is depicted a process for generating, by the processor 110, candidate state-transition datasets using a jerk-minimization algorithm 600, according to the non-limiting embodiments of the present technology.

Broadly speaking, the jerk-minimization algorithm 600 is configured to generate the given candidate state-transition dataset for the vehicle 220. To that end, the given candidate state transition dataset is indicative of an in-lane transition of the vehicle 220 from the initial state to one of the candidate states with a minimized in-lane jerk.

In the non-limiting embodiments of the present technology, an in-lane jerk associated with the vehicle 220 refers to a rate of acceleration/deceleration change associated with the vehicle 220 in a longitudinal direction, i.e. during the in-lane movement of the vehicle 220 and without considering a jerk during the transverse movement of the vehicle 220.

As an example of the implementation of the jerk-minimization algorithm 600, the jerk-minimization algorithm 600 may be based on a predetermined threshold value of in-lane acceleration/deceleration of the vehicle 220 at each of the plurality of intermediate moments in time $t_i$ of the given candidate state-transition dataset. Alternatively, according to the non-limiting embodiments of the present technology, the jerk-minimization algorithm 600 may further be based on, without being limited to:

a linear change of in-lane acceleration/deceleration and quadratic change of in-lane velocity;
a zero in-lane jerk and a linear change of in-lane velocity;
zero in-lane acceleration and a constant in-lane velocity.

In some non-limiting embodiments of the present technology, the jerk-minimization algorithm 600 may be configured for generating the given candidate state-transition dataset in a form of a speed profile. To that end, a given speed profile represents a vector of instantaneous velocity values of the vehicle 220, where each instantaneous velocity value corresponds to a respective one of the plurality of intermediate moments in time $t_i$ between the initial moment in time $t_0$ and the target moment in time $t_T$.

Accordingly, by using the jerk-minimization algorithm 600, the processor 110 is configured to generate a first candidate state-transition dataset 614 and a second candidate state-transition dataset 624 based on the first candidate kinematic data 314 ($x_v^1@t_T$; $v_v^1@t_T$; $a_v^1@t_T$), the second candidate kinematic data 324 ($x_v^2@t_T$; $v_v^2@t_T$; $a_v^2@t_T$), respectively, and the vehicle initial kinematic data 304 ($x_v@t_0$; $v_v@t_0$; $a_v@t_0$). The first candidate state-transition dataset 614 includes at least part of the kinematic data of the vehicle 220 ($x_i^1@t_i$, $v_i^1@t_i$, $a_i^1@t_i$) determined, based on the first candidate kinematic data 314, for each one of the plurality of intermediate moments in time $t_i$, where $x_i^1@t_i$ is a coordinate value of the vehicle 220 at one of the plurality of intermediate moments of time $t_i$ as part of the first candidate state-transition dataset 614;

$v_i^1@t_i$ is an instantaneous velocity value of the vehicle 220 at the one of the plurality of intermediate moments of time $t_i$ as part of the first candidate state-transition dataset 614; and $a_i^1@t_i$ is an instantaneous acceleration value of the vehicle 220 at the one of the plurality of intermediate moments of time $t_i$ as part of the first candidate state-transition dataset 614.

The at least part of the kinematic data of the vehicle 220 at a respective one of the plurality of intermediate moments in time $t_i$ is optimized to minimize the in-lane jerk associated with the transition of the vehicle 220 from the initial state to the first candidate state. This transition is hence a most jerk-efficient in-lane transition of the vehicle 220 from the initial state and the first candidate target state. The same applies mutatis mutandis to the second candidate state-transition dataset 624.

In the non-limiting embodiments of the present technology, in order to determine the most energy efficient in-lane transition of the vehicle 220, the processor 110 may further be configured to select one of the first candidate state-transition dataset and the second candidate state-transition dataset. By so doing, the processor 110 is configured to determine a target state-transition dataset. The target state-transition dataset defines the most energy efficient in-lane transition of the vehicle 220 from the initial state to a respective candidate target state.

In some non-limiting embodiments of the present technology, the processor 110 may be configured determine the target state-transition dataset based on energy efficiency scores associated with respective candidate state-transition datasets.

Figure 7:
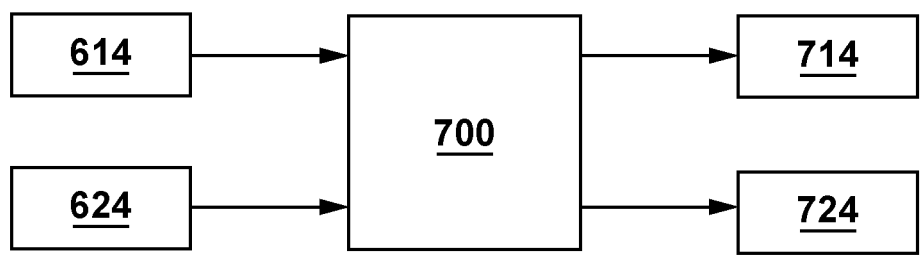
FIG. 7 depicts a process for determining, by the processor of the computer system of FIG. 1, an energy efficiency score associated with a respective candidate state-transition dataset, according to the non-limiting embodiments of the present technology.

With reference now to FIG. 7, there is depicted a process for determining energy efficiency scores associated with candidate state-transition datasets determined for the vehicle 220, according to the non-limiting embodiments of the present technology. To that end, the processor 110 may have access to an energy efficiency estimation model 700.

Broadly speaking, the energy efficiency estimation model 700 is configured to generate an energy efficiency score for a given transition of the vehicle 220 based on a respective candidate state-transition dataset. In the non-limiting embodiments of the present technology, the energy efficiency score may be indicative of an amount of fuel the vehicle 220 needs to perform the given transition. To that end, the energy efficiency estimation model 700 may represent a combination of time equations describing fuel consumption by the vehicle 220 in relation to the kinematic data associated therewith from the respective candidate state-transition dataset.

Thus, the processor 110 may be configured to determine: (1) based on the first candidate state-transition dataset 614, a first energy efficiency score 714; and (2) based on the second candidate state-transition dataset 624, a second energy efficiency score 724.

In the non-limiting embodiments of the present technology, in order to select one of the first candidate state-transition dataset 614 and the second candidate state-transition dataset 624, the processor 110 may compare the respective energy efficiency scores 714 and 724 to determine an energy efficiency score indicative of a lesser amount of fuel consumed by the vehicle 220. Thus, the processor 110 is configured to determine the target state-transition dataset as a most fuel-efficient candidate state-transition dataset.

For example, the processor 110 may have determined that the energy efficiency score 714 corresponds to a lesser amount of consumed fuel than that represented by the second energy efficiency score 724. Therefore, the processor 110 proceeds to select the first candidate state-transition dataset 614 as the target state-transition dataset, thereby determining the most energy efficient in-lane transition for the vehicle 220. To that end, at the initial moment in time $t_0$, the processor 110 triggers control of the in-lane movement of the vehicle 220 such that an actual kinematic data of the vehicle 220 at each of the plurality of intermediate moments in time $t_i$ matches a respective kinematic data in the first candidate state-transition dataset 614 ($x_i^1@t_i$, $v_i^1@t_i$, $a_i^1@t_i$).

In the non-limiting embodiments of the present technology, the processor 110 may be configured to trigger control of the in-lane movement of the vehicle 220 by manipulating at least one of the in-lane acceleration and in-lane deceleration of the vehicle 220. Thus, a respective transition of the vehicle 220 from the initial state to one of the candidate target states, caused by the processor 110, may be performed using only the in-lane movement of the vehicle 220.

In other words, the processor 110 causes the vehicle 220 to perform the most jerk-efficient in-lane transition from the initial state to the first candidate target state, by the target moment in time $t_T$, based on the determined energy efficiency scores 714 and 724. By so doing, the processor 110 causes the vehicle 220 to perform the lane change such that the vehicle 220, during the in-lane movement, would drive along the most fuel-efficient transition from the initial state; and during the transverse movement, would finish the lane change safely avoiding a collision with the obstacle 302.

In the non-limiting embodiments of the present technology, to determine the target state-transition dataset, the processor 110 may further be configured to determine a road-rule-abiding score for each of the candidate state-transition datasets associated with the vehicle 220. A given road-rule abiding score is indicative of whether a respective candidate state-transition dataset corresponds to a transition of the vehicle 220 from the initial state to a respective candidate target states allowing for abiding by the road rules or not. To that end, the processor 110 is configured to determine the target state-transition dataset as a most fuel-efficient candidate state-transition dataset allowing the vehicle 220 to perform the lane change without violating any road rules.

Figure 8:
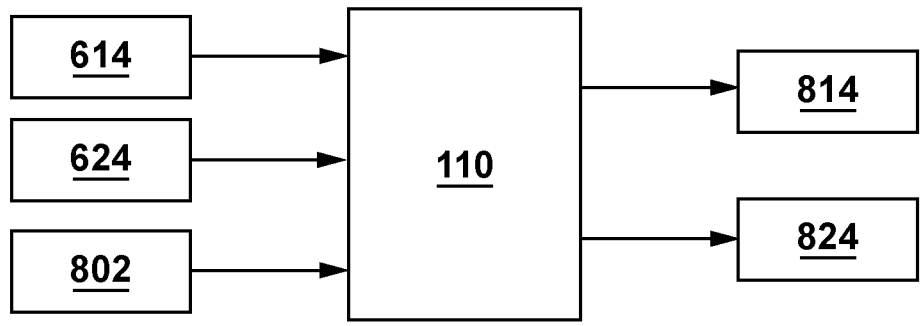
FIG. 8 depicts a process for determining, by the processor of the computer system of FIG. 1, a road-rule-abiding score associated with a respective candidate state-transition dataset, according to the non-limiting embodiments of the present technology.

With reference now to FIG. 8, there is depicted a process for determining road-rule-abiding scores for the candidate state-transition datasets determined associated with the vehicle 220, according to the non-limiting embodiments of the present technology.

As mentioned hereinabove, the processor 110, via the communication network 240, has access to the server 235. The server 235 provides the processor 110 with the information about road rules associated with the road map section 340. For example, the processor 110 inter alia may receive, from the server 235, an indication of a lane-change prohibition 802 within the road map section 340, which is depicted by the visual representation 322 in FIG. 3.

In this example, the processor 110 is configured to determine, based on the received indication of the lane-change prohibition 802: (1) a first road-rule abiding score 814, based on the first candidate state-transition dataset 614; and (2) a second road-rule abiding score, based on the second candidate state-transition dataset 624. Accordingly, based on the determined road-rule-abiding scores, the processor is configured to determine the target state-transition dataset.

For example, the processor 110 may have determined that the first road-rule abiding score 814 is 0, which means that the first candidate state-transition dataset 614 corresponds to the transition of the vehicle 220 from the initial state to the first candidate target state, which does not allow the vehicle 220 to abide by the road rules within the road map section 340. More specifically, referring to FIG. 3, to the visual representation 310 of the road map section 340 corresponding to the first candidate target state of the vehicle 220, this transition would result in violating the road rule prohibiting the lane-change, as at the target moment in time $t_T$, the transverse movement of the vehicle 220 would go through the visual representation 322. Therefore, the processor 110 then proceeds to discard the first candidate state-transition dataset 614 when determining the target state-transition dataset.

However, the processor 110 may have also determined that the second road-rule-abiding score 824 is 1, which means that the second candidate state-transition dataset 624 corresponds to the transition of the vehicle 220 from the initial state to the second candidate target state, which allows the vehicle 220 to abide by the road rules within the road map section 340. More specifically, referring to FIG. 3, to the visual representation 320 of the road map section 340 corresponding to the second candidate target state of the vehicle 220, this transition would result in performing, at the target moment in time $t_T$, the transverse movement of the vehicle 220 without violating any road rules. Therefore, as in the described example there are only two candidate state-transition datasets, the processor 110 then proceeds to determine the second candidate state-transition dataset 624 to be the target state-transition dataset.

Accordingly, the processor 110 triggers control of the in-lane movement of the vehicle 220 such that the actual kinematic data of the vehicle 220 at each of the plurality of intermediate moments in time $t_i$ matches a respective kinematic data from the second candidate state-transition dataset 624 ($x_i^2 @ t_i$, $v_i^2 @ t_i$, $a_i^2 @ t_i$).

In some non-limiting embodiments of the present technology the processor 110 may be configured to determine the target state-transition dataset based on more than two candidate state-transition datasets. To that end, the processor 110 may be configured to determine the target state-transition dataset based on both respective energy efficiency scores and road-rule-abiding scores associated with the candidate state-transition datasets.

Turning back to the example including the other obstacle following the obstacle 302 given with respect to FIG. 5. Let it be assumed that the second and the third candidate kinematic data of the vehicle 220 correspond to a second and a third candidate state-transition datasets (not depicted), respectively, determined according to the examples described above with respect to FIG. 6. Further, the processor 110 may be configured to determine a second and a third energy-efficiency scores associated with the respective candidate state-transition datasets (not depicted). Finally, the processor 110 may further be configured to determine respective second and third road-rule-abiding scores to be 1, that is corresponding to transitions of the vehicle 220 from the initial state to the second and the third candidate target state allowing the vehicle 220 to abide by the road rules in the road map section 340. Thus, the processor 110 then proceeds to determine the target state-transition dataset as one associated with higher energy efficiency score. In other words, the processor 110 then proceeds to determine the target state-transition dataset as the most fuel-efficient state-transition dataset between the second candidate state-transition dataset and the third candidate state-transition dataset.

In the non-limiting embodiments of the present technology, a number of road rules considered by the processor 110 when determining road-rule-abiding scores is not limited and may include other road rules prescribed for a given road map section.

For example, the processor 110 may determine that the first candidate state-transition dataset 614 includes, at some one of the plurality of intermediate time intervals $t_i$, an instantaneous velocity value of the vehicle 220 exceeding the speed limit prescribed for the road map section 340. Accordingly, the processor 110 is then configured to discard the first candidate state-transition dataset 614 when determining the target state-transition dataset. In another example, in the embodiments of FIG. 3, let it be assumed that instead of the visual representation 322 of the rule prohibiting the lane change, there is a visual representation of one, a crosswalk and an intersection. The processor 110 is then configured to discard the first candidate state-transition dataset 614 as the transition of the vehicle 220 associated with the first candidate state-transition dataset 614 would cause the vehicle 220 to violate road rules prescribing not to change a lane at intersections and crosswalks.

By so doing, the processor 110 causes the vehicle 220 to perform the lane change such that the vehicle 220, during the in-lane movement, would drive along the most fuel-efficient transition from the initial state abiding by the road rules prescribed for the given road map section; and during the transverse movement, would finish the lane change safely avoiding a collision with any obstacles.

Figure 9:
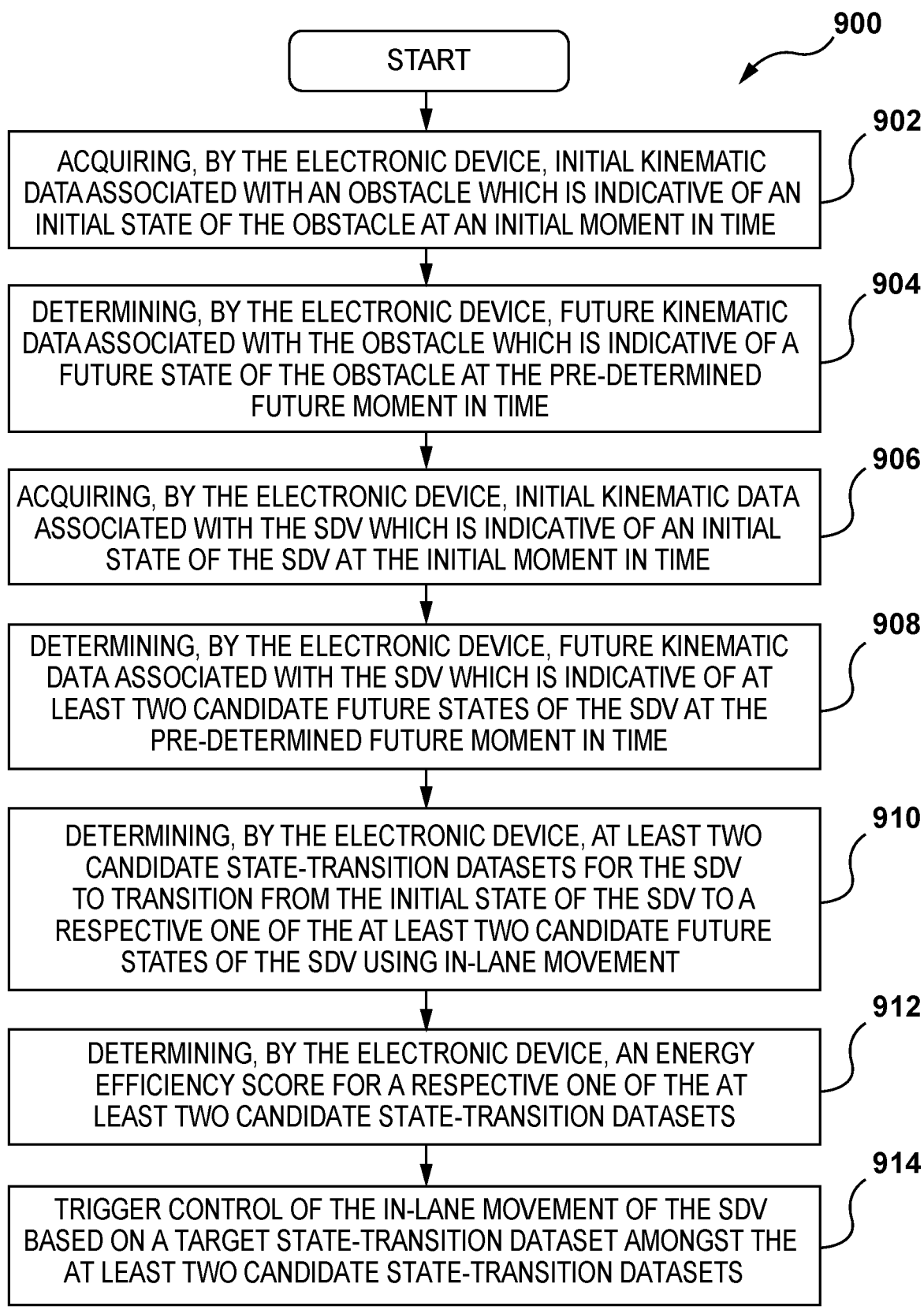
FIG. 9 depicts a flowchart diagram of a method for controlling in-lane movement of the vehicle of FIG. 2, according to the non-limiting embodiments of the present technology.

Given the architecture and the examples provided hereinabove, it is possible to execute a method for controlling in-lane movement of an SDV (the vehicle 220, for example). With reference now to FIG. 9, there is depicted a flowchart of a method 900, according to the non-limiting embodiments of the present technology. The method 900 is executable by the processor 110. The processor 110 may, for example, be part of the electronic device 210.

The method 900 is executed by the processor 110 to allow the vehicle 220 to perform a future manoeuvre at a predetermined future moment in time (for example, at the target moment in time $t_T$ described herein). The vehicle 220 is travelling down a lane as, for example, depicted in FIG. 3. In the non-limiting embodiments of the present technology, the future manoeuvre may be a lane change from an initial lane in which the vehicle 220 is traveling to one of neighboring lanes.

Generally speaking, the processor 110 causes the vehicle 220 to perform the lane change by (1) performing the in-lane movement from the initial moment in time $t_0$ until the target moment in time $t_T$; and (2) performing the transverse movement at the target moment in time $t_T$, which, in the example of FIG. 3, would be turning left. The processor 110 is configured to determine the initial moment in time $t_0$ to be earlier than the target moment in time $t_T$ by a predetermined time interval.

In the non-limiting embodiments of the present technology, the in-lane movement of the vehicle 220 is characterized by at least (1) a coordinate value along the axis 332, x; (2) an in-lane instantaneous velocity value, v; and (3) an in-lane instantaneous acceleration/deceleration value, a.

According to the non-limiting embodiments of the present technology, the one of neighbouring lanes, to which the vehicle 220 is caused to perform the lane change, may include at least one obstacle. The obstacle may be a moving obstacle (the obstacle 302 depicted in FIG. 3, for example) including another vehicle, for example, or an immobile obstacle.

Step 902—Acquiring, by the Electronic Device, Initial Kinematic Data Associated with an Obstacle which is Indicative of an Initial State of the Obstacle at an Initial Moment in Time The method 900 commences at the step 902 with the processor 110 acquiring initial kinematic data associated with the obstacle 302 using the sensor system 230 (the obstacle initial kinematic data 306 associated with the obstacle 302, for example).

In the non-limiting embodiments of the present technology, the obstacle initial kinematic data 306 ($x_{obs}@t_0$; $v_{obs}@t_0$; $a_{obs}@t_0$) is indicative of an initial state of the obstacle 302 at the initial moment in time $t_0$, which is depicted at the visual representation 300 in FIG. 3.

Step 904—Determining, by the Electronic Device, Future Kinematic Data Associated with the Obstacle which is Indicative of a Future State of the Obstacle at the Pre-Determined Future Moment in Time At step 904, the processor 110 is configured to determine, based on the obstacle initial kinematic data 306 ($x_{obs}@t_0$; $v_{obs}@t_0$; $a_{obs}@t_0$), the obstacle target kinematic data 316. In the non-limiting embodiments of the present technology, the obstacle target kinematic data 316 is indicative of the obstacle target state of the obstacle 302 at the target moment in time $t_T$. The obstacle target state is depicted at the visual representations 310 and 320 in FIG. 3.

In the non-limiting embodiments of the present technology, the processor 110 is configured, in order to determine the obstacle target kinematic data 316, to have access to a kinematic data estimation model. For example, the processor 110 may have access to the kinematic data estimation model 400, whereby the processor 110 determines the obstacle target kinematic data 316 ($x_{obs}@t_T$; $v_{obs}@t_T$; $a_{obs}@t_T$).

Step 906—Acquiring, by the Electronic Device, Initial Kinematic Data Associated with the SDV which is Indicative of an Initial State of the SDV at the Initial Moment in Time At step 906, the processor 110 is configured, by virtue of using the sensor system 230, to acquire the vehicle initial kinematic data 304 ($x_v@t_0$; $v_v@t_0$; $a_v@t_0$) associated with the vehicle 220. According to the non-limiting embodiments of the present technology, the vehicle initial kinematic data 304 is indicative of the initial state of the vehicle 220 at the initial moment in time $t_0$, which is depicted at the visual representation 300 in FIG. 3.

In the non-limiting embodiments of the present technology, the initial state of the vehicle 220 refers to a state, whereat the processor 110 starts to cause the vehicle 220 to perform the in-lane movement as part of performing the lane change.

Step 908—Determining, by the Electronic Device, Future Kinematic Data Associated with the SDV which is Indicative of at Least Two Candidate Future States of the SDV at the Pre-Determined Future Moment in Time At step 908, the processor 110 is configured to determine at least two candidate kinematic data of the vehicle 220 associated with respective candidate target states of the vehicle 220. A given candidate target state of the vehicle 220 is a state of the vehicle 220, whereat the processor 110 causes the vehicle 220 to finish the in-lane movement having a given candidate kinematic data, and to start the transverse movement in order to perform the lane change considering the obstacle 302. In other words, the given candidate target state of the vehicle 220 refers to a state of the vehicle 220 at the target moment in time $t_T$, which the vehicle 220 is caused to take from the initial state having driven along an in-lane trajectory.

In the non-limiting embodiments of the present technology, the processor 110 is configured to determine the given candidate kinematic data for the vehicle 220 such that the vehicle avoids any collision with the obstacle 302 when performing the transverse movement.

To that end, the processor 110 is configured to provide the vehicle 220 with at least two options of the in-lane trajectory: (1) accelerating the vehicle 220 so the vehicle 220 is ahead of the obstacle 302 at a distance being no less than the first safety margin—which can be, for example, depicted by the visual representation 310 of the road map section 340; or (2) decelerating the vehicle 220 so the vehicle 220 is before the obstacle 302 at a distance being no less than the second safety margin—which can be, for example, depicted by the visual representation 320 of the road map section 340. The processor 110 may be configured to select the first safety margin and the second safety margin in such a way that the vehicle 220, from the target moment in time $t_T$ until finishing the lane change, would avoid any collision with the obstacle 302. By so doing, the processor 110 is configured to determine at least the first candidate target state and the second candidate target state for the vehicle 220 to perform the in-lane movement from the initial state. Accordingly, the first and the second candidate target states of the vehicle 220 correspond to states of the vehicle 220 whereat the vehicle 220 is free of the obstacle 302, which allows the vehicle 220 to perform the lane change safely, i.e. avoiding any collision with the obstacle 302. To that end, the first candidate target state and the second candidate target state of the vehicle 220 at the target moment in time $t_T$ correspond to respective windows of opportunity for the vehicle 220 to perform the lane change considering the obstacle 302.

In the non-limiting embodiments of the present technology, the processor 110 is then configured to determine respective candidate kinematic data for the vehicle 220 corresponding to the first candidate target state and the second candidate target state. In this regard, the processor 110 may have access to a candidate final kinematic data estimation model. For example, having access to the candidate final kinematic data estimation model 500 described above with reference to FIG. 5, the processor 110, based on the vehicle initial kinematic data 304 and the obstacle target kinematic data 316, may determine: (1) the first candidate kinematic data 314 ($x_v^1@t_T$; $v_v^1@t_T$; $a_v^1@t_T$), and (2) the second candidate kinematic data 324 ($x_v^2@t_T$; $v_v^2@t_T$; $a_v^2@t_T$).

Step 910—Determining, by the Electronic Device, at Least Two Candidate State-Transition Datasets for the SDV to Transition from the Initial State of the SDV to a Respective One of the at Least Two Candidate Future States of the SDV Using In-Lane Movement At step 910, having determined kinematic data of the vehicle 220 corresponding to the initial state and one or more candidate target states of the vehicle 220, the processor 110 is further configured, based thereon, to determine respective candidate state-transition datasets. In the non-limiting embodiments of the present technology, a given candidate state-transition dataset defines an in-lane transition of the vehicle 220 from the initial state to a respective candidate target state.

In the non-limiting embodiments of the present technology, the given candidate state-transition dataset represents a data structure (a vector, for example) including at least part of kinematic data (a coordinate value, an in-lane velocity value, or an in-lane acceleration value, for example) of the vehicle 220 determined for each of a plurality of intermediate moments in time $t_i$ between the initial moment in time $t_0$ and the target moment in time $t_T$.

In the non-limiting embodiments of the present technology, the processor 110 may be configured to select the plurality of intermediate moments in time $t_i$ based on a predetermined step value. However, other ways of selecting the plurality of intermediate moments in time can also be used by the processor 110 in order to select the plurality intermediate moments in time $t_i$.

In the non-limiting embodiments of the present technology, to determine respective candidate state-transition datasets, the processor 110 may have access to a jerk-minimization algorithm. For example, the processor 110 may have access to the jerk-minimization algorithm 600 described hereinabove with reference to FIG. 6 that is used for minimizing associated in-lane jerks. Thus, the processor 110 is configured to supply (1) the vehicle initial kinematic data 304, (2) the first candidate kinematic data 314, (3) and the second candidate kinematic data 324 to the jerk-minimization algorithm 600. Consequently, the jerk-minimization algorithm 600 outputs the first candidate state-transition dataset 614 and the second candidate state-transition dataset 624. Accordingly, the first candidate state-transition dataset 614 includes, for each of the plurality of intermediate moments in time $t_i$, a respective kinematic data of the vehicle 220 ($x_i^1 @ t_i$, $v_i^1 @ t_i$, $a_i^1 @ t_i$). The second candidate state-transition dataset includes, for each of the plurality of intermediate moments in time $t_i$, a respective kinematic data of the vehicle 220 ($x_i^2 @ t_i$, $v_i^2 @ t_i$, $a_i^2 @ t_i$).

Thus, each of the first candidate state-transition dataset 614 and the second candidate state-transition dataset 624 corresponds to a respective most jerk-efficient state-transition dataset defining a respective in-lane transition of the vehicle 220 from the initial state to a respective candidate target state using only in-lane movement.

In some non-limiting embodiments of the present technology, the processor 110 may be configured to generate the given candidate state-transition dataset in a form of a speed profile. A given speed profile represents a vector, where a respective velocity value of the vehicle 220 corresponds to each of the plurality of intermediate moments in time $t_i$. By applying the jerk-minimization algorithm 600 to generate the given speed profile, the processor 110 optimizes each instantaneous velocity value of the vehicle 220 corresponding to a respective one of the plurality of intermediate moments in time $t_i$ to minimize respective in-lane jerks associated therewith.

In the non-limiting embodiments of the present technology, the processor 110 may be further configured to select one of the first candidate state-transition dataset 614 and the second candidate state-transition dataset 624, thereby determining a target state-transition dataset. The target state-transition dataset defines a most energy-efficient in-lane transition of the vehicle 220 from the initial state to a respective candidate target state.

Step 912—Determining, by the Electronic Device, an Energy Efficiency Score for a Respective One of the at Least Two Candidate State-Transition Datasets At step 912, to determine the target state-transition dataset, the processor 110 is configured to determine energy efficiency scores for in-lane transitions of the vehicle 220 defined by the first candidate state-transition dataset 614 and the second candidate state-transition dataset 624.

In the non-limiting embodiments of the present technology, a given energy efficiency score is indicative of an amount of fuel the vehicle 220 needs to perform a given in-lane transition. Thus, the given energy efficiency score is indicative of how fuel-efficient the given in-lane transition of the vehicle 220 is. To determine the given energy-efficiency score, the processor 110 may have access to an energy efficiency estimation model.

For example, the processor 110 may have access to the energy efficiency estimation model 700 described herein with reference to FIG. 7. Thus, the processor 110 may be configured to determine the first energy efficiency score 714 and the second energy efficiency score 724.

In the non-limiting embodiments of the present technology, the processor 110 may further be configured to compare the first energy efficiency score 714 to the second energy efficiency score 724, in order to determine the most fuel-efficient in-lane transition of the vehicle 220 corresponding to the target state-transition dataset. To that end, the processor 110 is configured to determine an energy efficiency score that would correspond to a lesser amount of consumed fuel.

For example, the processor 110 may have determined that the energy efficiency score 714 corresponds to a lesser amount of fuel than that associated with the second energy efficiency score 724. Accordingly, the processor 110 determines the target state-transition dataset to be the first candidate state-transition dataset 614 as the first candidate state-transition dataset 614 is thereby determined to be a most fuel-efficient state-transition dataset amongst the at least two candidate state-transition datasets associated with the vehicle 220.

In the non-limiting embodiments of the present technology, the processor 110 may further be configured to determine, for each candidate state-transition dataset, a road-rule-abiding score. The road-rule-abiding score is indicative of whether a given in-lane transition of the vehicle 220 between the initial state and a respective candidate target state abides by road rules prescribed for a given road map section (the road map section 340, for example).

To that end, the processor 110 may have access, via the communication network 240, to the server 235. The server 235 provides the processor 110 with the information about road rules associated with the road map section 340. Thus, the processor 110 is configured to receive, from the server 235, an indication of at least one road rule, for example, the lane-change prohibition 802 within the road map section 340 discussed above with reference to FIG. 8.

In the example of FIG. 8, the processor 110 may be configured to determine, based on the received indication of the lane-change prohibition 802: (1) a first road-rule abiding score 814, based on the first candidate state-transition dataset 614; and (2) a second road-rule abiding score, based on the second candidate state-transition dataset 624. Accordingly, based on the determined road-rule-abiding scores, the processor is configured to determine the target state-transition dataset.

For example, the processor may have determined that the first road-rule abiding score 814 is 0 (the transition to the first candidate target state does not abide by the road rules), and the second road-rule-abiding score 824 is 1 (the transition to the second candidate target state abides by the road rules). Accordingly, the processor 110 is configured to proceed to determine the target state-transition dataset as the second candidate state-transition dataset 624 as the in-lane transition of the vehicle 220 defined thereby abides by the road rules prescribed for the road map section 340.

Thus, the processor 110 is configured to determine the target state-transition dataset as the most fuel-efficient dataset amongst the at least two candidate state-transition datasets that allows the vehicle 220 to abide by the road rules prescribed for the given road map section.

Step 914—Trigger Control of the In-Lane Movement of the SDV Based on a Target State-Transition Dataset Amongst the at Least Two Candidate State-Transition Datasets At step 914, the processor 110 causes the vehicle 220 to perform an in-lane transition from the initial state to a respective candidate target state associated with the target state-transition dataset. In this regard, the processor 110 triggers control of at least one of in-lane acceleration and in-lane deceleration such that an actual kinematic data of the vehicle 220 at each of the plurality of intermediate moments in time $t_i$ matches a respective target kinematic data from the target state-transition dataset.

In the example, where the processor 110 has determined the target state-transition dataset as the first candidate state-transition dataset 614, at the initial moment in time $t_0$, the processor 110 triggers control of the in-lane movement of the vehicle 220 such that an actual kinematic data of the vehicle 220 at each of the plurality of intermediate moments in time $t_i$ matches a respective kinematic data in the first candidate state-transition dataset 614 ($x_i^1 @ t_i$, $v_i^1 @ t_i$, $a_i^1 @ t_i$). By so doing, the processor 110 causes the vehicle 220 to perform the lane change such that the vehicle 220, during the in-lane movement, would drive along the most fuel-efficient transition from the initial state; and during the transverse movement, would finish the lane change safely avoiding a collision with the obstacle 302.

In the other example, where the processor 110 has determined the target state-transition dataset as the second candidate state-transition dataset 624, at the initial moment in time $t_0$, the processor 110 triggers control of the in-lane movement of the vehicle 220 such that the actual kinematic data of the vehicle 220 at each of the plurality of intermediate moments in time $t_i$ matches a respective kinematic data from the second candidate state-transition dataset 624 ($x_i^2 @ t_i$, $v_i^2 @ t_i$, $a_i^2 @ t_i$). By so doing, the processor 110 causes the vehicle 220 to perform the lane change such that the vehicle 220, during the in-lane movement, would drive along the most fuel-efficient transition from the initial state abiding by the road rules prescribed for the given road map section; and during the transverse movement, would finish the lane change safely avoiding a collision with the obstacle 302.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of controlling in-lane movement of a Self-Driving Vehicle (SDV),
the SDV travelling in-lane on a road section,
the in-lane movement of the SDV to be controlled for allowing the SDV to perform a future manoeuvre, the future manoeuvre to be performed at a pre-determined future moment in time, the pre-determined future moment in time being a moment in time when the SDV is free of an obstacle;
the method executable by an electronic device communicatively coupled to the SDV, the method comprising:
acquiring, by the electronic device, initial kinematic data associated with the obstacle which is indicative of an initial state of the obstacle at an initial moment in time,
the initial moment in time being earlier in time than the pre-determined future moment in time;
determining, by the electronic device, future kinematic data associated with the obstacle which is indicative of a future state of the obstacle at the pre-determined future moment in time;
acquiring, by the electronic device, initial kinematic data associated with the SDV which is indicative of an initial state of the SDV at the initial moment in time;
determining, by the electronic device, based on the future kinematic data of the obstacle, for the pre-determined future moment in time, future kinematic data associated with the SDV which is indicative of at least two candidate future states of the SDV at the pre-determined future moment in time, the at least two candidate future states comprising a first candidate future state and a second candidate future state, both the first and second candidate future states being for the predetermined future moment in time, each one of the at least two candidate future states of the SDV allowing the SDV to perform the future manoeuvre at the pre-determined future moment in time;
generating, by the electronic device, at least two candidate state transition datasets comprising a first candidate state transition dataset and a second candidate state transition dataset, wherein a given candidate state-transition dataset represents a data structure including at least part of a candidate kinematic data about the SDV at a plurality of intermediate moments in time between the initial moment in time and the pre-determined future moment in time,
the first candidate state transition dataset indicative of an in-line acceleration transition of the SDV from the initial state to the first candidate future state of the SDV with a minimized in-lane jerk, the first candidate state transition dataset generated by inputting the first candidate future state of the SDV into an in-line jerk minimization algorithm, and
the second candidate state transition dataset indicative of an in-line deceleration transition of the SDV from the initial state to the second candidate future state of the SDV with a minimized in-lane jerk, the second candidate state transition dataset generated by inputting the second candidate future state of the SDV into the in-line jerk minimization algorithm;
determining, by the electronic device, an energy efficiency score for each of the at least two candidate state-transition datasets,
a given energy efficiency score being indicative of how fuel-efficient the transition between the initial state and the respective candidate future state is; and
triggering, by the electronic device, control of the in-lane movement of the SDV based on a target state-transition dataset amongst at least two candidate state-transition datasets,
the target state-transition dataset being a most fuel-efficient state-transition dataset amongst the at least two candidate state-transition datasets.

2. The method of claim 1, wherein the method further comprises: comparing, by the electronic device, the energy efficiency scores of the at least two candidate state-transition datasets for determining the target state-transition dataset.

3. The method of claim 1, wherein the method further comprises:
- determining, by the electronic device, a road-rule-abiding score for a respective one of the at least two candidate state-transition datasets,
  - a given road-rule-abiding score being indicative of whether the transition between the initial state and the respective candidate future state abides by road rules of the road section;
- and wherein the target state-transition dataset is the most fuel-efficient state-transition dataset amongst the at least two candidate state-transition datasets that allows the SDV to abide by the road rules of the road section.

4. The method of claim 1, wherein the future manoeuvre is a lane-change from an initial lane in which the SDV is travelling at the initial moment time to another lane in which the obstacle is present at the initial moment in time.

5. The method of claim 1, wherein the obstacle is one of a moving obstacle and an immobile obstacle.

6. The method of claim 5, wherein the moving obstacle is another vehicle.

7. The method of claim 1, wherein the triggering control of the in-lane movement of the SDV based on a target state-transition dataset comprises: triggering, by the electronic device, control of at least one of in-lane acceleration and in-lane deceleration of the SDV, such that (i) actual kinematic data of the SDV at the plurality of intermediate moments in time matches (ii) target kinematic data from the target state-transition dataset at the plurality of intermediate moments in time.

8. The method of claim 1, the at least two candidate future states of the SDV at the pre-determined future moment in time correspond to respective windows of opportunity to perform the future manoeuvre at the pre-determined future moment in time.

9. The method of claim 1, wherein in-lane movement is characterized by at least one of: an in-lane acceleration and an in-lane deceleration.

10. The method of claim 1, wherein the in-lane jerk minimization algorithm generates the at least two candidate state-transition datasets for the SDV, the at least two candidate state-transition datasets for the SDV being represented as speed profiles.

11. The method of claim 10, wherein the speed profiles are optimized to minimize the in-lane jerks.

12. An electronic device comprising:
- a processor;
- a communication interface for communicating with a sensor mounted on a Self-Driving Vehicle (SDV),
  - the SDV travelling in-lane on a road section, the in-lane movement of the SDV to be controlled for allowing the SDV to perform a future manoeuvre, the future manoeuvre to be performed at a pre-determined future moment in time, the pre-determined future moment in time being a moment in time when the SDV is free of an obstacle;
- the processor being configured to:
  - acquire initial kinematic data associated with the obstacle which is indicative of an initial state of the obstacle at an initial moment in time,
    - the initial moment in time being earlier in time than the pre-determined future moment in time;
  - determine future kinematic data associated with the obstacle which is indicative of a future state of the obstacle at the pre-determined future moment in time;
  - acquire initial kinematic data associated with the SDV which is indicative of an initial state of the SDV at the initial moment in time;
  - determine, based on the future kinematic data of the obstacle, for the predetermined future moment in time, future kinematic data associated with the SDV which is indicative of at least two candidate future states of the SDV at the pre-determined future moment in time, the at least two candidate future states comprising a first candidate future state and second candidate future state, both the first and second candidate future states being for the predetermined future moment in time,
    - each one of the at least two candidate future states of the SDV allowing the SDV to perform the future manoeuvre at the pre-determined future moment in time;
  - generate at least two candidate state transition datasets comprising a first candidate state transition dataset and a second candidate state transition dataset, wherein a given candidate state-transition datasets represents a data structure including at least part of candidate kinematic data about the SDV at a plurality of intermediate moments in time between the initial moment in time and the pre-determined future moment in time,
    - the first candidate state transition dataset indicative of an in-line acceleration transition of the SDV from the initial state to the first candidate future state of the SDV with a minimized in-lane jerk the first candidate state transition datasets is generated by inputting the first candidate future state of the SDV into an in-line jerk minimization algorithm, and
    - the second candidate state transition dataset indicative of an in-line deceleration transition of the SDV from the initial state to the second candidate future state of the SDV with a minimized in-lane jerk, the second candidate state transition datasets is generated by inputting the second candidate future state of the SDV into the in-line jerk minimization algorithm;
  - determine an energy efficiency score for each of the at least two candidate state-transition datasets,
    - a given energy efficiency score being indicative of how fuel-efficient the transition between the initial state and the respective candidate future state is; and
  - trigger control of the in-lane movement of the SDV based on a target state-transition dataset amongst the at least two candidate state-transition datasets, the target state-transition dataset being a most fuel-efficient state-transition dataset amongst the at least two candidate state-transition datasets.

13. The electronic device of claim 12, wherein the processor is further configured to:
- compare the energy efficiency scores of the at least two candidate state-transition datasets for determining the target state-transition dataset.

14. The electronic device of claim 12, wherein the processor is further configured to:

determine a road-rule-abiding score for a respective one of the at least two candidate state-transition datasets,
a given road-rule-abiding score being indicative of whether the transition between the initial state and the respective candidate future state abides by road rules of the road section; and wherein
the target state-transition dataset is the most fuel-efficient state-transition dataset amongst the at least two candidate state-transition datasets that allows the SDV to abide by the road rules of the road section.

15. The electronic device of claim 12, wherein the processor configured to trigger control of the in-lane movement of the SDV based on a target state-transition dataset is further configured to:
trigger control of at least one of in-lane acceleration and in-lane deceleration of the SDV, such that
(i) actual kinematic data of the SDV at the plurality of intermediate moments in time matches (ii) target kinematic data from the target state-transition dataset at the plurality of intermediate moments in time.

16. The electronic device of claim 12, wherein the processor, using the in-lane jerk minimization algorithm, is configured to generate the at least two candidate state-transition datasets for the SDV, the at least two candidate state-transition datasets for the SDV being represented as speed profiles.

* * * * *